United States Patent
Miyajima

(10) Patent No.: US 9,729,743 B2
(45) Date of Patent: Aug. 8, 2017

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Jun Miyajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 14/520,191

(22) Filed: Oct. 21, 2014

(65) Prior Publication Data

US 2015/0036158 A1 Feb. 5, 2015

Related U.S. Application Data

(62) Division of application No. 13/181,235, filed on Jul. 12, 2011, now abandoned.

(30) Foreign Application Priority Data

Jul. 23, 2010 (JP) ................................ 2010-165788

(51) Int. Cl.
*G06K 15/00* (2006.01)
*H04N 1/00* (2006.01)
*G03G 15/00* (2006.01)

(52) U.S. Cl.
CPC ..... *H04N 1/00596* (2013.01); *G03G 15/5012* (2013.01); *G03G 15/6529* (2013.01); *H04N 1/00623* (2013.01); *H04N 1/00655* (2013.01); *H04N 2201/0081* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,233,425 | B1* | 5/2001 | Ohkubo | G03G 21/046 399/366 |
| 6,389,248 | B1* | 5/2002 | Konno | H04N 1/00915 399/81 |
| RE40,629 | E * | 1/2009 | Konno | H04N 1/00915 399/81 |
| 2003/0030836 | A1* | 2/2003 | Maekawa | H04N 1/00002 358/1.14 |

(Continued)

*Primary Examiner* — John Wallace
*Assistant Examiner* — Kevin Ky
(74) *Attorney, Agent, or Firm* — Canon U.S.A., Inc. IP Division

(57) ABSTRACT

A printing apparatus has first and second sheet storage units, where a second sheet conveyance path is longer than a first sheet conveyance path, and includes a determining unit and a permitting unit. When a sheet stored in the first sheet storage unit is for printing of a Nth page included in a first job and a sheet stored in the second sheet storage unit is for printing of a N+1th page included in the same first job, the determining unit determines a feeding schedule in which the N+1th page sheet feeding is initiated before the Nth page sheet feeding is initiated. When an issued instruction is issued to perform a second job by interrupting the first job after determining the feeding schedule, the permitting unit permits printing of a page included in the second job before the printing of the N+1th page included in the first job.

24 Claims, 25 Drawing Sheets

(56) References Cited

U.S. PATENT DOCUMENTS

| | | | |
|---|---|---|---|
| 2006/0001898 A1* | 1/2006 | Maeshima | H04N 1/00342 358/1.14 |
| 2007/0109586 A1* | 5/2007 | Yamada | G06F 3/121 358/1.14 |
| 2008/0025737 A1* | 1/2008 | Matsui | G03G 15/6561 399/21 |
| 2010/0046977 A1* | 2/2010 | Inenaga | H04N 1/00408 399/81 |

* cited by examiner

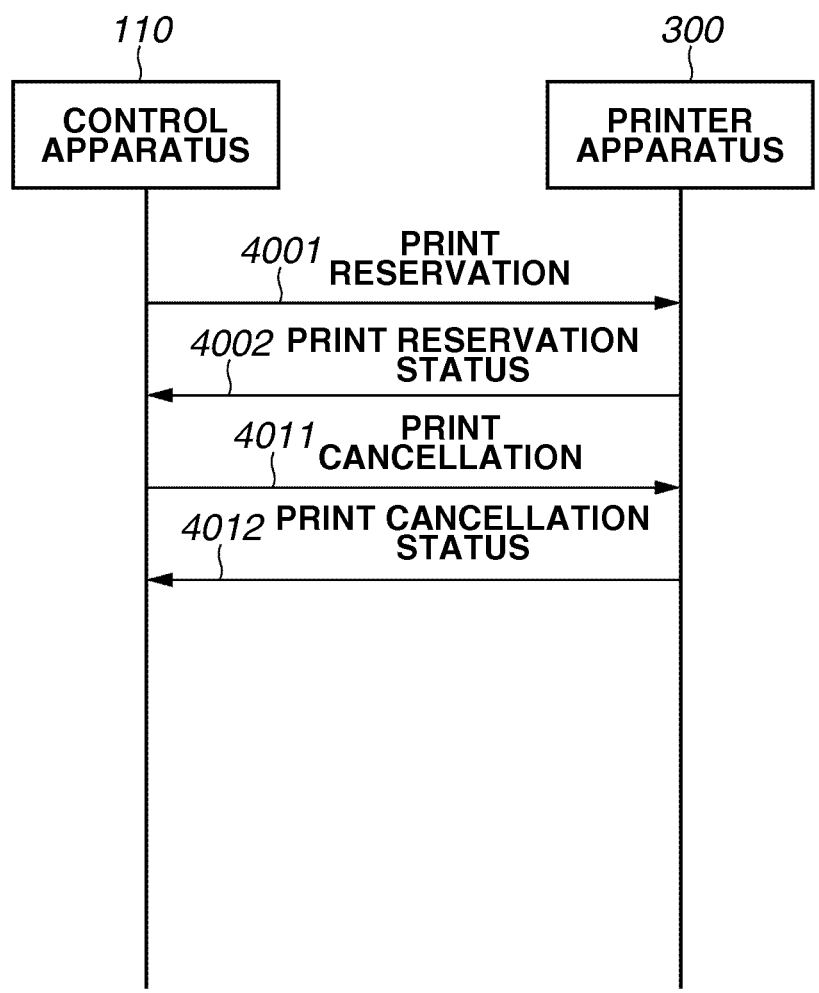

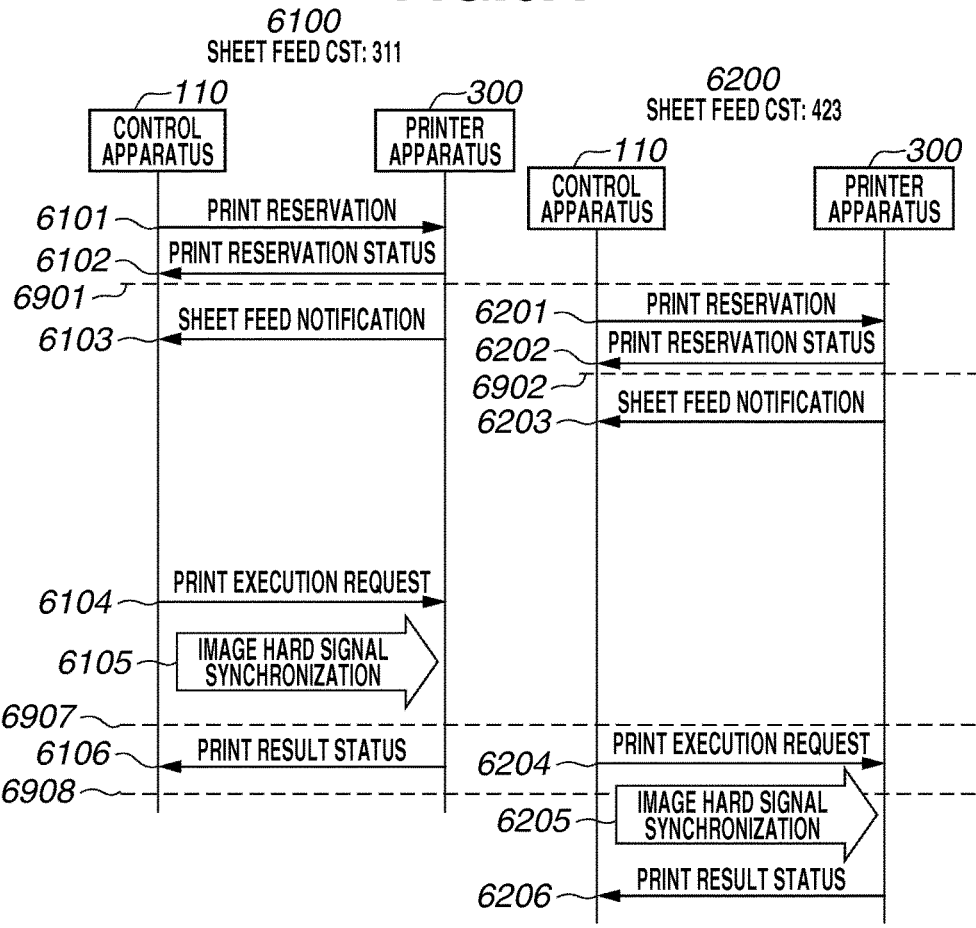
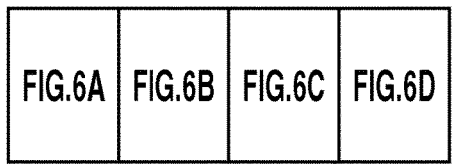

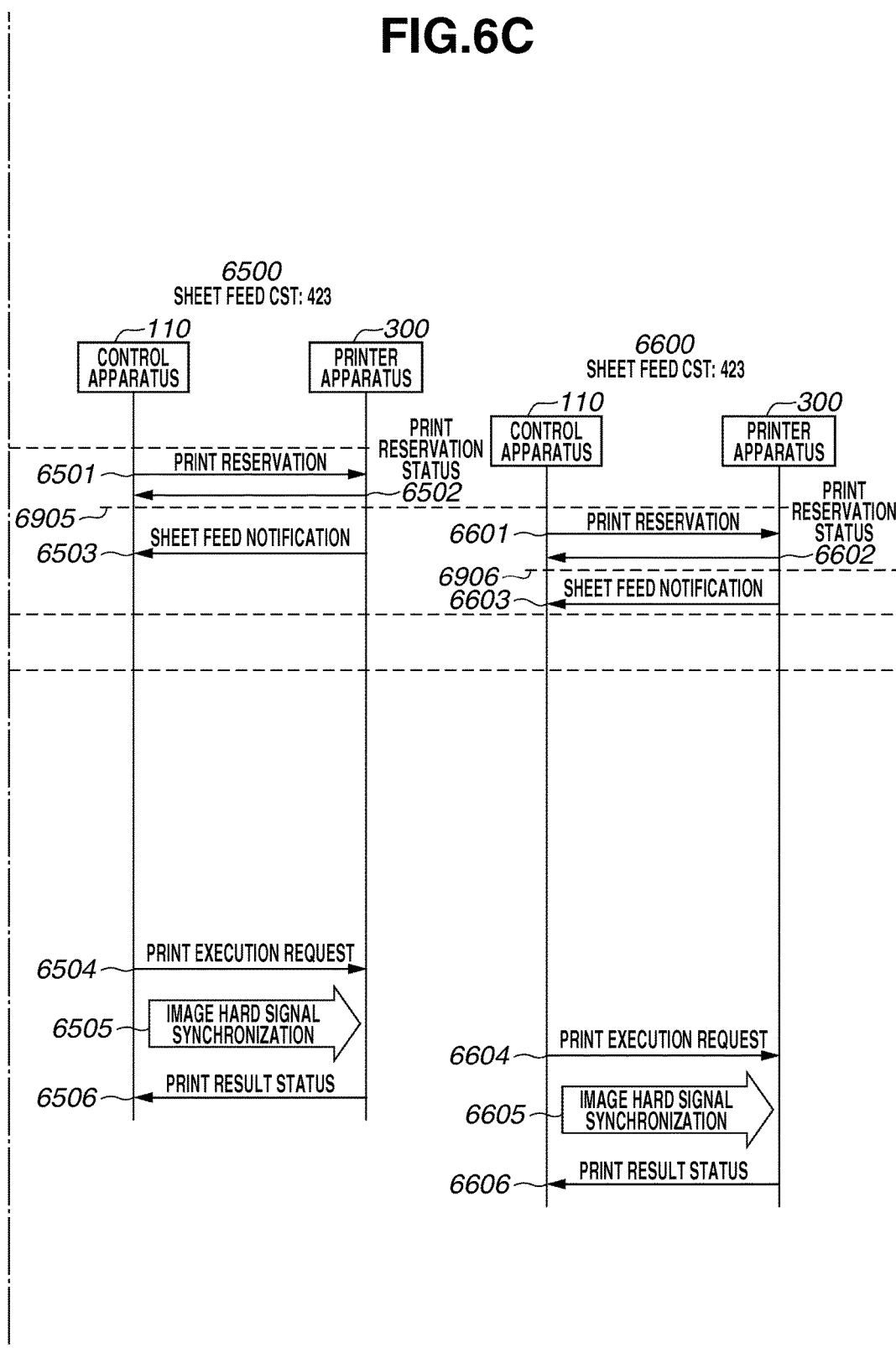

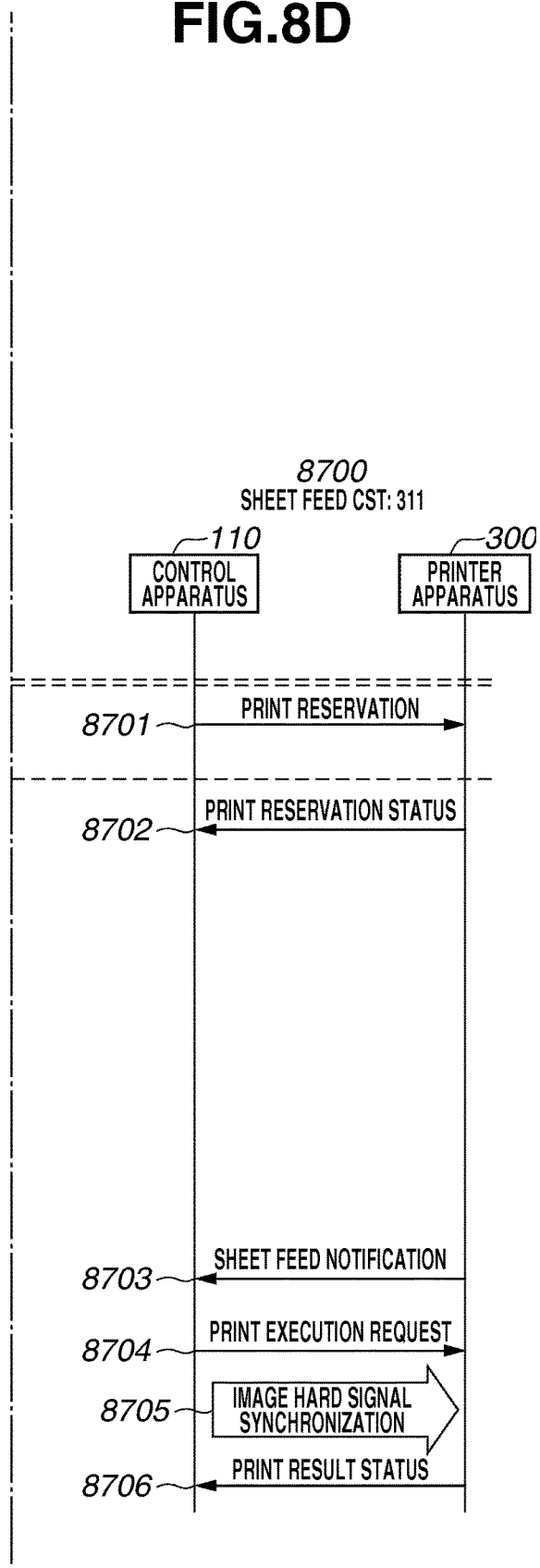

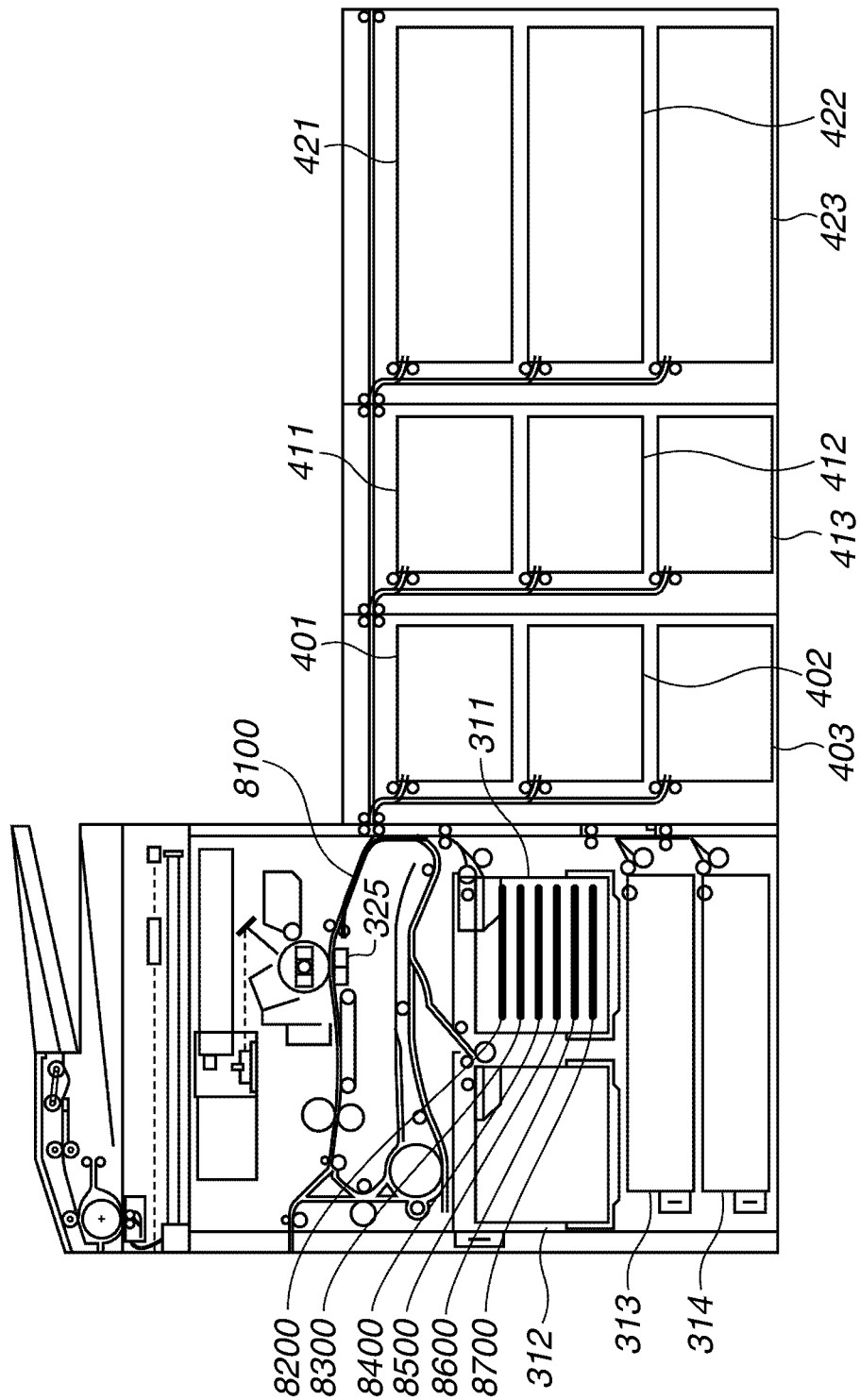

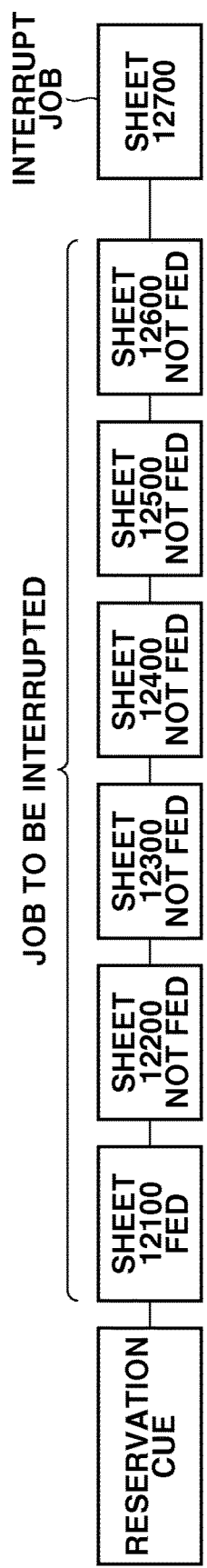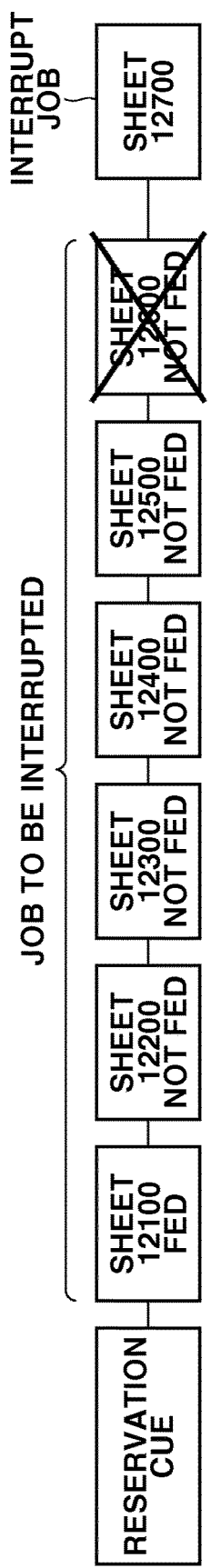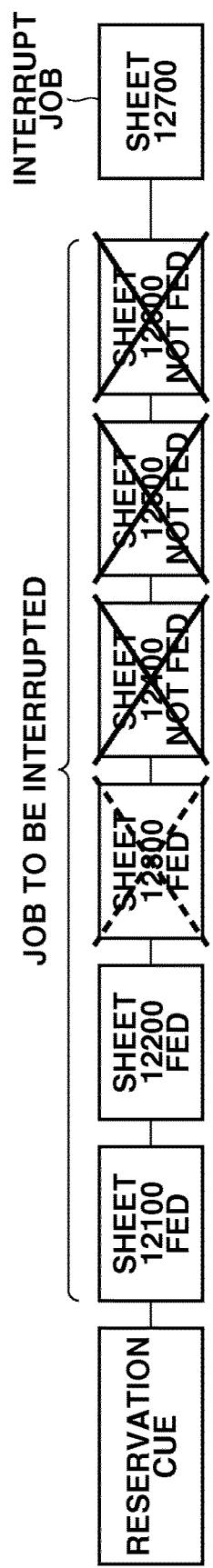

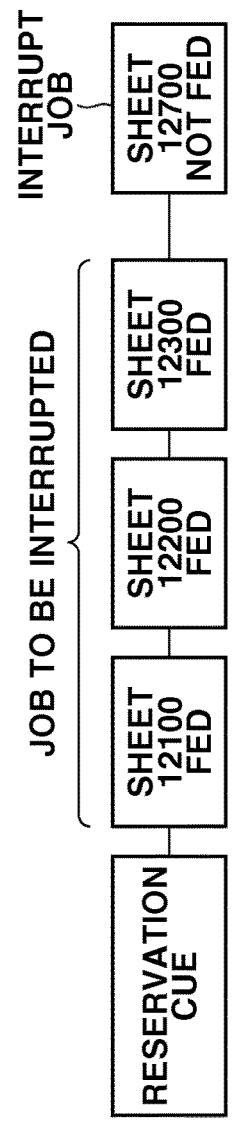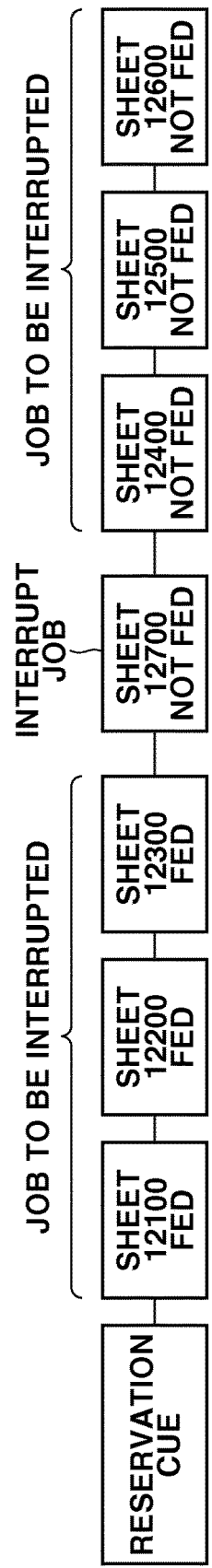

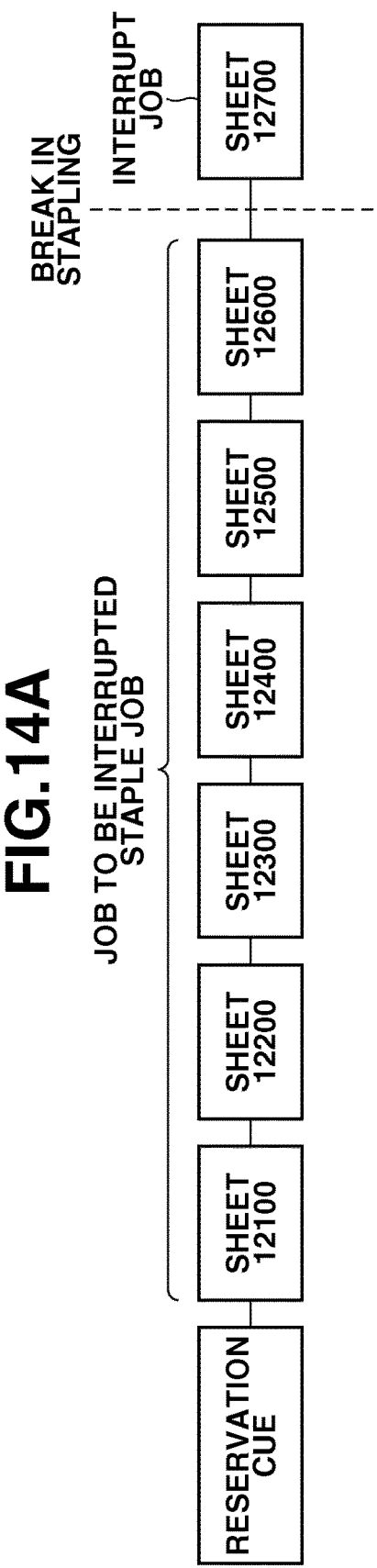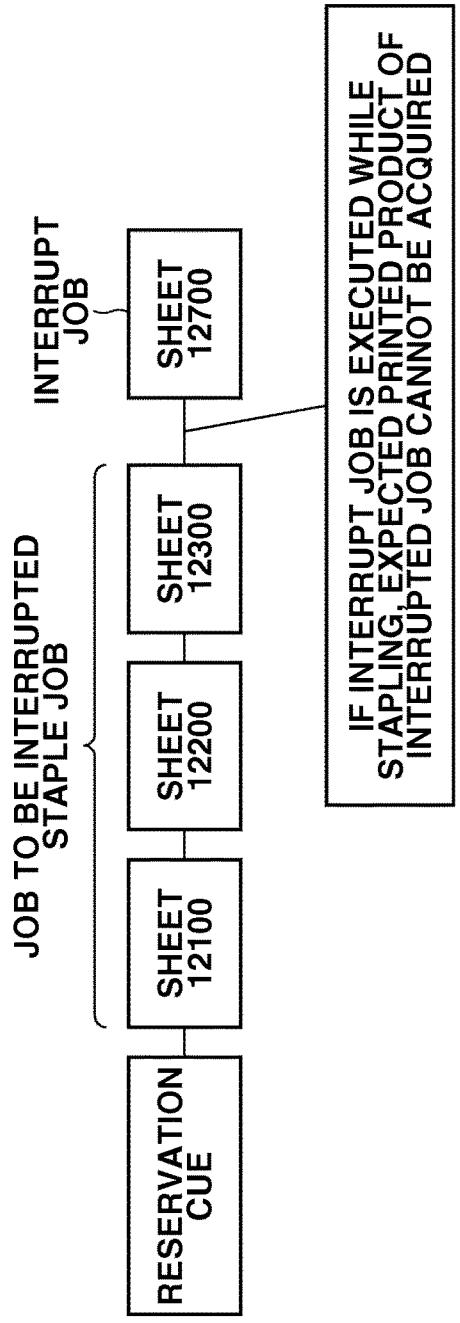

IMAGE FORMING APPARATUS, CONTROL METHOD OF IMAGE FORMING APPARATUS, AND STORAGE MEDIUM

CROSS REFERENCE TO RELATED APPLICATIONS

The present application is a divisional of U.S. patent application Ser. No. 13/181,235, filed on Jul. 12, 2011, which claims priority from Japanese Patent Application No. 2010-165788, filed Jul. 23, 2010, all of which are hereby incorporated by reference herein in their entirety.

BACKGROUND OF THE INVENTION

Field of the Invention

The present invention relates to an image forming apparatus, a control method of an image forming apparatus, and a storage medium.

Description of the Related Art

Conventionally, there is an image forming apparatus that feeds sheets from a sheet storing unit such as a sheet feed cassette and prints an image on the fed sheet. Further, there is an image forming apparatus that includes a plurality of sheet storing units. In such a case, distance from the sheet storing unit to a transfer unit is different for each sheet storing unit. For example, if a plurality of sheet feed decks can be attached to the image forming apparatus as optional devices, the distance from the sheet feed cassette included in the image forming apparatus main body to the transfer unit is different from the distance from the sheet feed cassette in the sheet feed decks to the transfer unit. If such an image forming apparatus feeds the sheets by feeding a subsequent sheet on condition that the previous sheet has been fed, intervals between the sheets become excessively long. For example, if an instruction is issued to feed the subsequent sheet from the sheet storing unit disposed far from the transfer unit, after feeding the sheet from the sheet storing unit disposed near the transfer unit, the intervals between the sheets become excessively long. In general, only a minimal predetermined interval for printing the image on the sheets is necessary as the intervals between the sheets. However, in the above-described case, the intervals become longer than such a predetermined necessary interval, so that productivity in printing is lowered.

To reduce such lowering of productivity in printing, a conventional image forming apparatus performs control as described below. A control apparatus (i.e., a controller unit) in the image forming apparatus inputs into a reservation cue, print reservation of a sheet to be fed, before issuing a sheet feed instruction to actually feed the sheet. The image forming apparatus then sets a sheet feed schedule of the sheets according to information about the print reservations input into the reservation cue. The image forming apparatus thus feeds the sheets according to the sheet feed schedule and prints the image on the fed sheets. As a result, the image forming apparatus can previously recognize that the sheet to be fed subsequent to the sheet fed from the sheet storing unit disposed near the transfer unit is to be fed from the sheet storing unit disposed far from the transfer unit. The control unit thus issues ahead of time, an instruction to feed the sheet from the sheet storing unit that is far from the transfer unit, so that the interval between the sheet and the previous sheet can be prevented from becoming excessively long. Such an operation is referred to as advance sheet feed (or preliminary sheet feed) (refer to Japanese Patent Application Laid-Open No. 2005-335929).

On the other hand, there is an image forming apparatus that interrupts a job being executed and then executes a different job (hereinafter referred to as an interrupt job) while interrupting the original job. Such a function is referred to as an interrupt function (refer to Japanese Patent Application Laid-Open No. 2003-228257). Such an interrupt function allows a different job to be executed without waiting for completion of the job being executed, so that a user can quickly acquire a printed product.

However, if there are print reservations of sheets in the image forming apparatus, and the user uses the interrupt function to instruct execution of the interrupt job, the sheet to be printed by executing the interrupt job is not fed until all the sheets that have been print-reserved have been fed. In particular, if a large number of sheets are print-reserved, the time necessary for discharging the printed product corresponding to the interrupt job becomes long. It thus becomes necessary for the user to wait for a long time to receive the printed product.

SUMMARY OF THE INVENTION

According to an aspect of the present invention, a printing apparatus has a first sheet storage unit and a second sheet storage unit, wherein a sheet conveyance path from the second sheet storage unit is longer than a sheet conveyance path from the first sheet storage unit, and is capable of performing a print job for printing an image on a sheet. The printing apparatus includes a determining unit configured to determine, in a case where a sheet stored in the first sheet storage unit is to be used for printing of a Nth page included in a first job and a sheet stored in the second sheet storage unit is to be used for printing of a N+1th page included in the first job, a feeding schedule in which feeding of the sheet to be used for the printing of the N+1th page is initiated before feeding of the sheet to be used for the printing of the Nth page is initiated, and a permitting unit configured to permit, in a case where an instruction is issued to perform a second job by interrupting the first job after the determining unit determines the feeding schedule, printing of a page included in the second job before the printing of the N+1th page included in the first job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a sequence diagram illustrating a process flow according to an exemplary embodiment.

FIG. 9 illustrates sheet conveyance according to an exemplary embodiment.

FIGS. 11A, 11B, 11C, 11D, and 11E illustrate sheet feed reservation states according to an exemplary embodiment.

FIGS. 14A and 14B illustrate sheet feed reservation states according to an exemplary embodiment.

DESCRIPTION OF THE EMBODIMENTS

Various exemplary embodiments, features, and aspects of the invention will be described in detail below with reference to the drawings. If an instruction is received from a user to execute an interrupt job, time from receiving the instruction to executing the interrupt job is prevented from becoming long due to print reservation of a sheet in another job. A control method for controlling an image forming apparatus that forms an image on a sheet by executing a job includes executing an interrupt job while interrupting a job being executed, cancelling, if an interrupt job is executed, sheet feed reservation of a sheet for the job being executed, and performing control to execute the interrupt job after cancelling the sheet feed reservation of the sheet.

Figure 1:
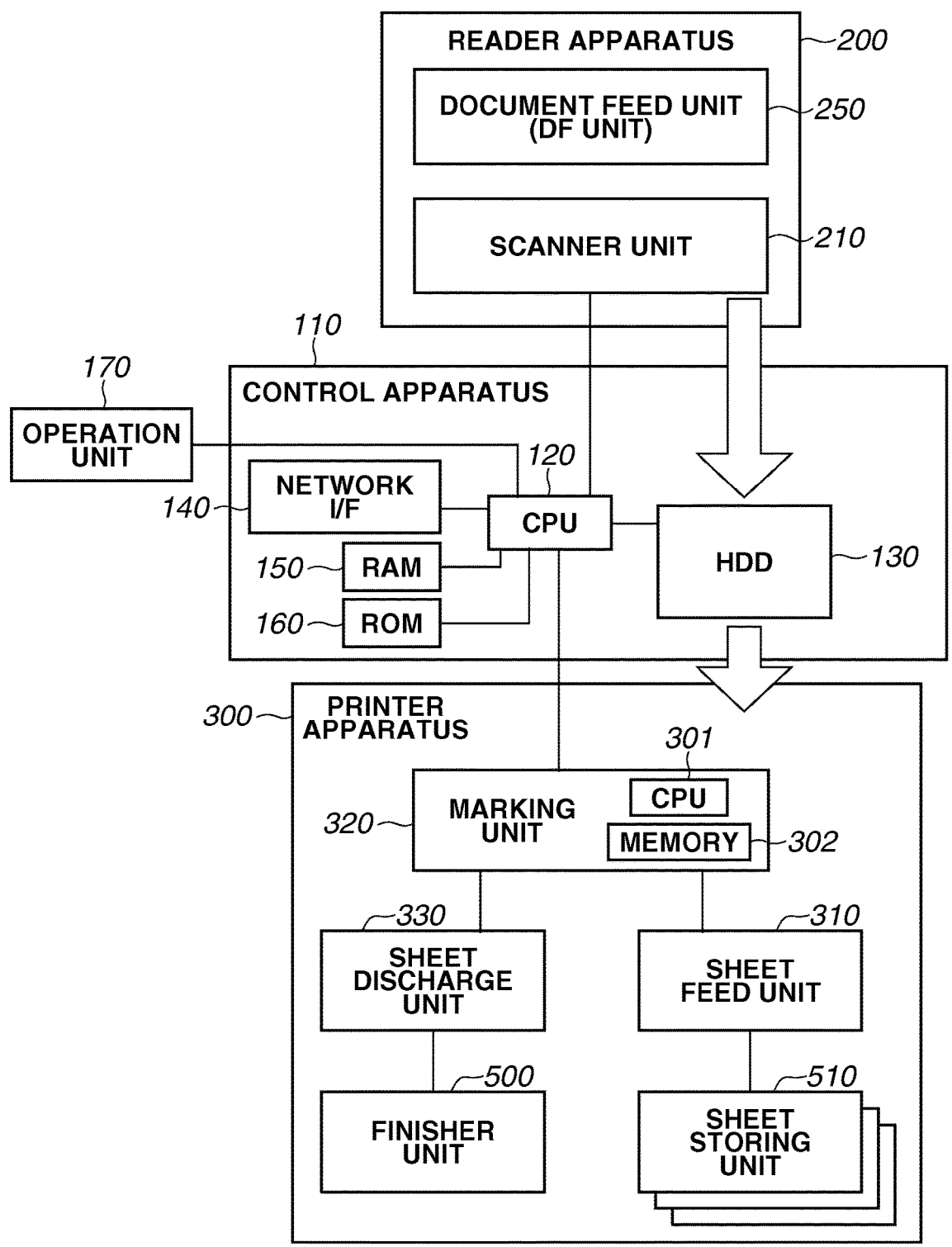
FIG. 1 is a block diagram illustrating a configuration of an image forming apparatus according to an exemplary embodiment.

FIG. 1 is a block diagram illustrating a configuration of an image forming apparatus 100 according to a first exemplary embodiment.

Referring to FIG. 1, the image forming apparatus 100 includes a reader apparatus (i.e., a reader unit) 200, a control apparatus (i.e., a control unit or a controller unit) 110, and a printer apparatus (i.e., a printer unit) 300.

The reader apparatus 200 includes a document feed unit 250 and a scanner unit 210. The document feed unit 250 conveys one-by-one to the scanner unit 210, a plurality of document sheets. The scanner unit 210 then reads the image of the conveyed document and generates image data. Further, the scanner unit 210 includes a document stage (i.e., a platen glass 211 illustrated in FIG. 2), and is capable of reading the image of the document set on the document stage and generating the image data. The scanner unit 210 then transmits the generated image data to the control apparatus 110.

The control apparatus 110 includes a central processing unit (CPU) 120, an image memory 130, an operation unit 170, a network interface (I/F) 140, a random access memory (RAM) 150, and a read-only memory (ROM) 160. The control apparatus 110 is electrically connected to the reader apparatus 200 and the printer apparatus 300.

The CPU 120 comprehensively controls the image forming apparatus 100. The RAM 150 functions as a work area of the CPU 120. The ROM 160 stores various programs to be read by the CPU 120. The CPU 120 performs various processes by reading from the ROM 160 and executing the programs. The network interface (I/F) 140 is used when the image forming apparatus 100 communicates with an external device. For example, the CPU 120 transmits and receives via the network I/F 140, the image data and commands to and from an external personal computer (PC). The image forming apparatus 100 connects to the external PC via a network or a universal serial bus (USB) cable.

The operation unit 170 includes a liquid crystal display (LCD) unit and hard keys. The LCD unit displays an operation screen for operating the image forming apparatus 100, the image data, and various messages. Further, a touch panel is attached to the LCD unit, and the operation unit 170 receives user instructions from the touch panel.

The printer apparatus 300 includes sheet storing units 510 such as the sheet feed cassettes, a sheet feed unit 310 that feeds the sheets from the sheet feed cassettes using a sheet feed roller, a marking unit 320, a sheet discharge unit 330, and a finisher unit 500. The printer apparatus 300 feeds the sheets from the sheet storing unit 510 using the sheet feed unit 310. The marking unit 320 then forms the image on the fed sheet, and the sheet discharge unit 330 discharges the sheet on which the image is formed. The finisher unit 500 performs post processing such as stapling and punching as necessary on the sheets discharged by the sheet discharge unit 330.

The image forming apparatus 100 includes a scanner function, a print function, a copy function, a box function, and a data transmission function. The scanner function stores in a hard disk drive (HDD) 130, the data corresponding to the image of the document read by the reader apparatus 200. The print function prints using the printer apparatus 300, the image according to the image data received by the network I/F 140. The copy function prints using the printer apparatus 300, the image of the document read by the reader apparatus 200. The box function prints using the printer apparatus 300, the image according to the image data stored in the HDD 130. The data transmission function transmits to the external device via the network I/F 140, the image data of the document read by the reader apparatus 200 or the image data stored in the HDD 130. The CPU 120 in the image forming apparatus 100 manages in the HDD 130, a process using the above-described function as one job (e.g., a copy job or a print job). The CPU 120 is capable of storing and managing a plurality of jobs in the HDD 130, and sequentially executes each of the jobs stored in the HDD 130.

Figure 2:
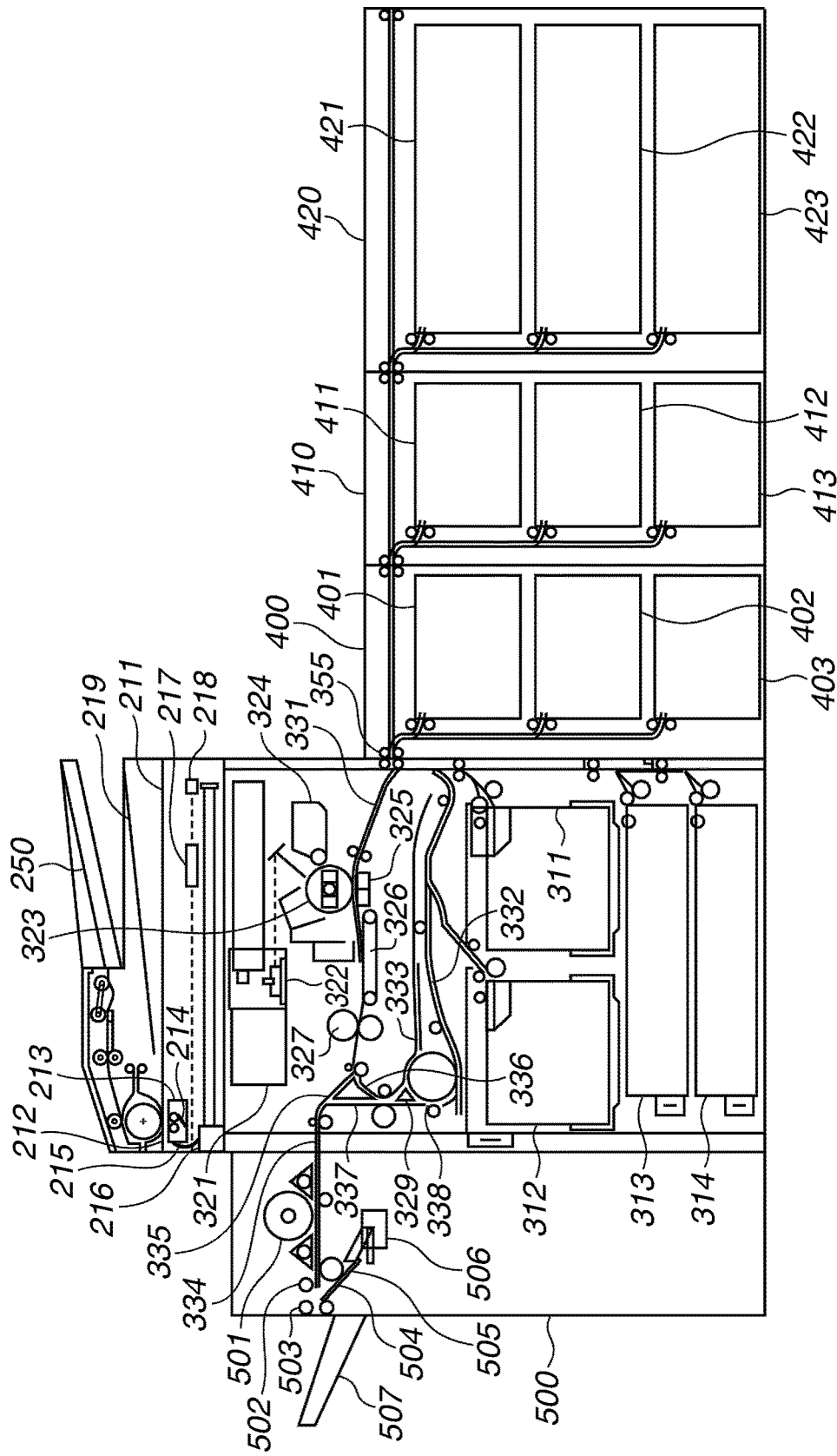
FIG. 2 is a cross-sectional view illustrating a configuration of the image forming apparatus according to an exemplary embodiment.

FIG. 2 is a cross-sectional view illustrating the configuration of the image forming apparatus 100. Referring to FIG. 2, the image forming apparatus 100 includes an image forming apparatus main body, and sheet feed decks 400, 410, and 420, and a finisher unit 500, as optional devices that can be connected to the image forming apparatus.

If the user sets the document on the platen glass 211, the scanner unit 210 turns on a lamp 212, and scan-exposes the document my moving an optical unit 213. The light reflected on the document is then guided to a charge-coupled device sensor (CCD) 218 via mirrors 214, 215, 216, and lens 217. The CCD 218 thus reads the image of the scanned document.

Further, the user may set the document on the document feed unit 250. In such a case, the scanner unit 210 performs control so that each sheet of the document is sequentially conveyed to the platen glass 211. The optical unit 214 then scan-exposes the conveyed document, and the CCD 218 reads the image of the document. The document is then discharged to a discharge tray 219.

The image read by the CCD 218 is transferred to the control apparatus 110 after predetermined processing for the image data has been performed.

A laser driver 321 drives a laser emitting unit 322. More specifically, the laser driver 321 causes the laser emitting unit 322 to emit laser beam according to the image data output from the control apparatus 110. The laser emitting unit 322 emits the laser beam to a photosensitive drum 323, so that a latent image corresponding to the laser beam is formed on the photosensitive drum 323. A developing unit 324 then attaches a developer (toner) on the latent image portion of the photosensitive drum 323.

Further, the image forming apparatus 100 includes as the sheet storing unit 510, drawer type sheet feed cassettes 311, 312, 313, and 314. Furthermore, the image forming apparatus 100 is connected to the sheet feed decks 400, 410, and 420. The sheet feed decks 400, 410, and 420 each include three sheet feed cassettes. The sheet feed deck 400 includes sheet feed cassettes 401, 402, and 403, the sheet feed deck 410 includes sheet feed cassettes 411, 412, and 413, and the sheet feed deck 420 includes sheet feed cassettes 421, 422, and 423. The user replenishes the sheets (i.e., recording sheets, papers, or recording media) by pulling out each sheet feed cassette. Each of the sheet feed cassettes can store sheets of different size or different type. The user sets via the operation unit 170 the size and type of sheets to be stored in each sheet feed cassette. The CPU 120 stores in the HDD 130 and manages the sheet sizes and types set by the user.

The printer apparatus 300 feeds the sheet from one of the sheet feed cassettes 311, 312, 313, 314, 401, 402, 403, 411, 412, 413, 421, 422, and 423, and conveys the fed sheet to a transfer unit 325 via a sheet conveyance path 331. The transfer unit 325 then transfers the developer attached to the photosensitive drum 323 to the sheet. A conveyance belt 326 conveys to a fixing unit 327 the sheet on which the developer is transferred, and the developer is fixed on the sheet by heat and pressing force applied by the fixing unit 327. The sheet which passes through the fixing unit 327 is then conveyed to a conveyance path 335 and a conveyance path 334. If the sheet is to be discharged by reversing a printed side of the sheet, the sheet is guided to a conveyance path 336 and a conveyance path 338. The sheet is then conveyed in an opposite direction and is conveyed through a conveyance path 337 and the conveyance path 334.

Further, if the printer apparatus is set to perform two-sided printing, the sheet after passing through the fixing unit 327 is guided from the conveyance path 336 to the conveyance path 333 by a flapper 329. The sheet is then conveyed in an opposite direction and guided to the conveyance path 338 and a re-feed conveyance path 332 by the flapper 329. The sheet guided to the re-feed conveyance path 332 passes through the conveyance path 331 at the above-described timing and is conveyed to the transfer unit 325.

The sheet discharged from the conveyance path 334 is conveyed to the finisher unit 500, in both one-sided printing and two-sided printing.

The sheet conveyed to the finisher unit 500 is conveyed to a buffer roller 501, and is wrapped around the buffer roller 501 as necessary and buffered. For example, if time is necessary to perform stapling by a stapling unit disposed downstream from the buffer roller 501, sheet conveyance speed of the sheet conveyed from the image forming apparatus 100 main body can be controlled by using the buffer roller 501.

The sheet that has passed through the buffer roller 501 is discharged to a discharge tray 507 by an upper discharge roller pair 502 and a lower discharge roller pair 503.

If the printer apparatus 300 is set to perform stapling, the sheet is pulled back by a knurled belt 504 and temporarily stacked on a stacking tray 505, by the time the upper discharge roller pair 502 conveys the sheet and the trailing end of the sheet reaches the upper discharge roller pair 502. When a predetermined number of sheets to be stapled is stacked on the stacking tray 505, a stapling unit 506 staples the sheets, and the lower discharge roller pair 503 then discharges the sheets to the discharge tray 507. If the printer apparatus 300 is set to perform shift sorting, the sheets that are temporarily stacked on the stack tray 505 are discharged to the discharge tray 507 after being offset to the left and the right by a predetermined amount using a shift mechanism (not illustrated). By performing shift sorting, an end of a copy of the discharged printed product or an end of the job becomes easily recognizable.

Figure 3:
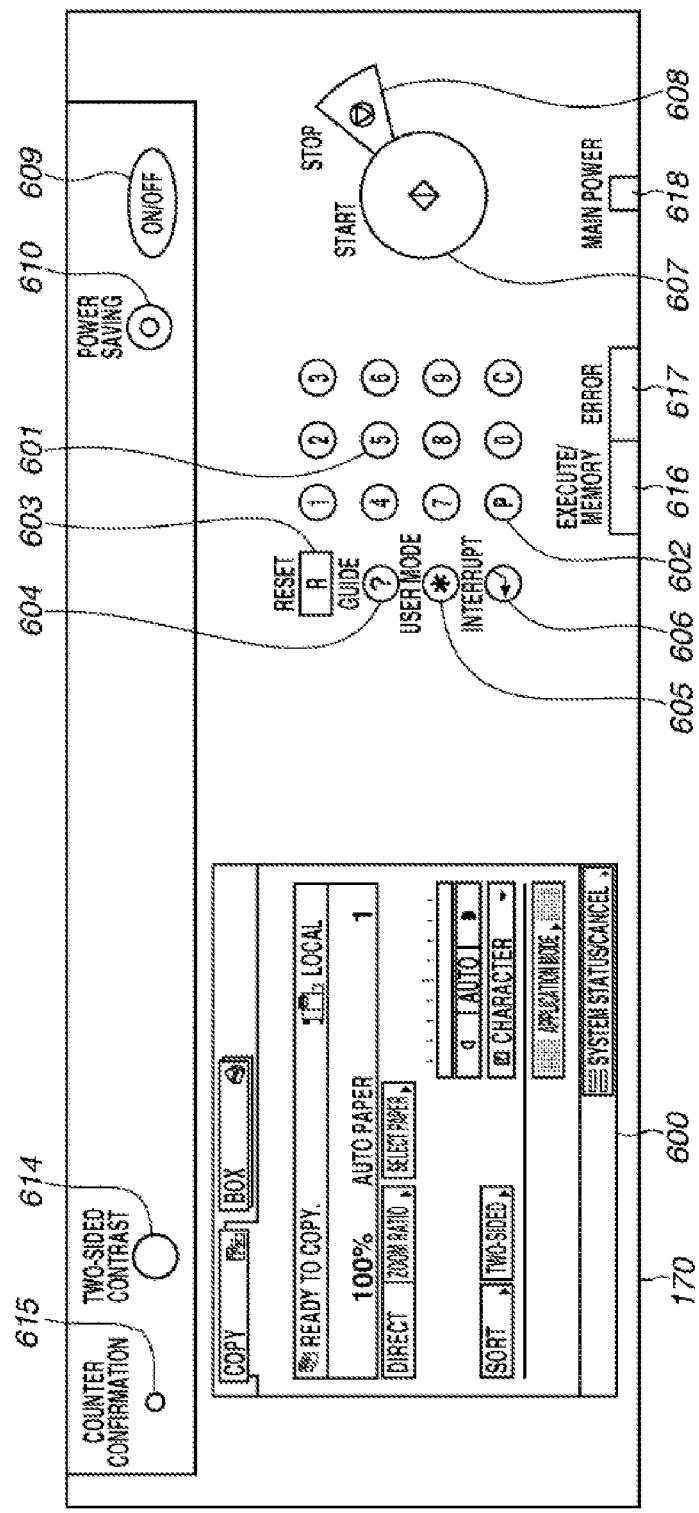
FIG. 3 illustrates a configuration of an operation unit according to an exemplary embodiment.

The configuration of the operation unit 170 will be described below with reference to FIG. 3. Referring to FIG. 3, the operation unit 170 includes an LCD touch panel 600. The LCD touch panel 600 displays an operation screen of the copy function, or the operation screens of the box function and the data transmission function. The control apparatus 110 displays the operation screen on the LCD touch panel 600 and receives from the user via the displayed operation screen, job settings such as one-sided or two-sided printing, and reduced layout. The control apparatus 110 then stores the received settings in the RAM 150 or the HDD 130. Further, the control apparatus 110 also receives via the LCD touch panel 600, the settings of the size and type of sheets stored in the sheet discharge cassettes, and stores the received settings in the RAM 150 or the HDD 130.

Ten keys 601 are used for inputting the numerals 0, 1, 2, 3, 4, 5, 6, 7, 8, and 9. An identification (ID) key 602 is used for inputting, when the apparatus is managed by a department, a department number or a password.

A reset key 603 is used for resetting a set mode. A guide key 604 is used for displaying a guide screen for each mode. A user mode key 605 is used when entering a user mode screen.

An interrupt key 606 is used when interrupting the job being executed and executing a different job in preference to the interrupted job while the job is being interrupted. A start key 607 is used for starting various operations such as copy and data transmission. A stop key 608 is used for cancelling a job being executed.

A soft power switch 609 is used for switching off a back light of the LCD touch panel 600. A power saving key 610 is used to shift the image forming apparatus 100 to a power saving state in which consumed power is lower than in a normal power consumption state. If the image forming apparatus 100 is in a low power consumption state and the user re-presses the power saving key 610, the image forming apparatus 100 is restored from the power saving state.

An adjustment key 614 is used for adjusting contrast of the LCD touch panel. A counter confirmation key 615 is used for displaying an accumulated number of copies. An "execute/memory" light-emitting diode (LED) 616 indicates that the job is being executed, or the image is being stored in the image memory. An error LED 617 indicates that an error is occurring in the apparatus, such as a paper jam or a door is open. A power LED 618 indicates that a main power of the image forming apparatus 100 is switched on.

Figure 4:
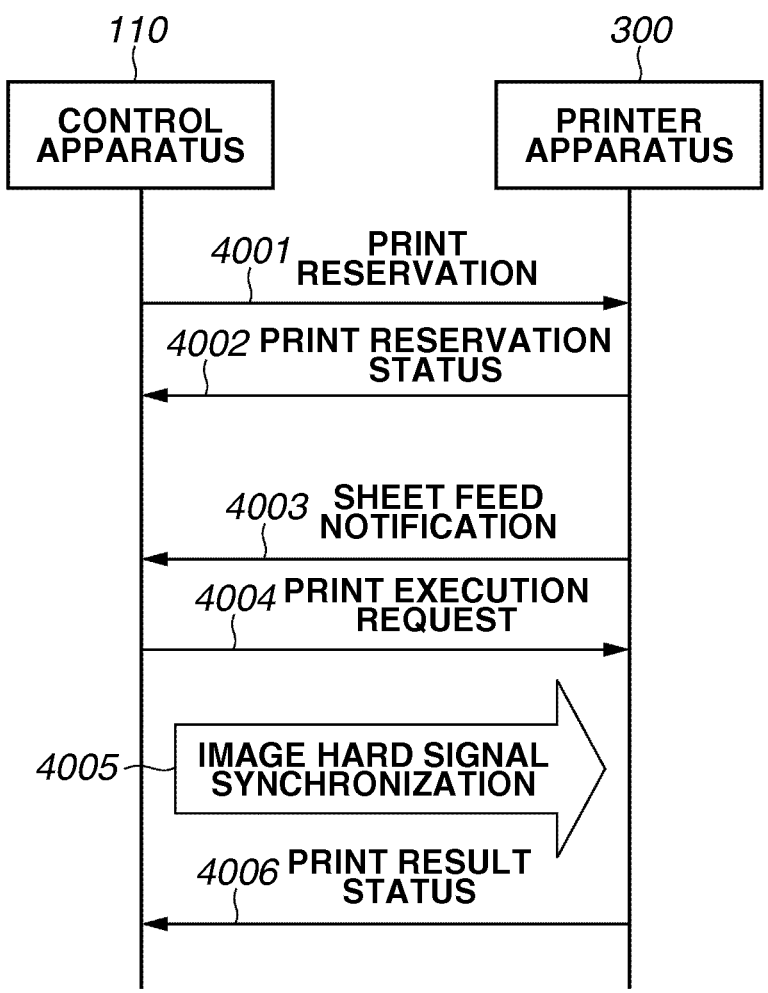
FIG. 4 is a sequence diagram illustrating a process flow according to an exemplary embodiment.

FIG. 4 is a schematic diagram illustrating a communication sequence performed between the control apparatus 110 and the printer apparatus 300 illustrated in FIG. 1. The sequence diagram of FIG. 4 illustrates a case where an image is printed on one sheet. The process performed by the control apparatus 110 is realized by the CPU 120 in the control apparatus 110 executing the program stored in the ROM 160. Further, the process performed by the printer apparatus 300 is realized by a CPU 301 in the printer apparatus 300 executing the program stored in a memory 302.

Referring to FIG. 4, the control apparatus 110 analyzes the received job, and upon completing analysis of one sheet to be fed, the control apparatus 110 issues print reservation 4001 (i.e., sheet feed reservation) to the printer apparatus 300. For example, a copy job may be executed in which the printer apparatus 300 is to print the image of the document read by the reader apparatus 200. In such a case, the control apparatus 110 issues the print reservation 4001 according to the number of pages of the document read by the reader apparatus 200 and setting values set by the user using the operation unit 170.

If the user has set using the operation unit 170, one-sided printing and 1-in-1 (no reduction layout) printing, one sheet is printed when one page of the image has been read. The control apparatus 100 thus issues the print reservation 4001 to the printer apparatus 300 on condition that the reader apparatus 200 has read one page (one sheet) of the document.

Further, if the user has set using the operation unit 170, one-sided printing and 2-in-1 printing, one sheet is fed and printed when two pages of the image has been read. The control apparatus 100 thus issues the print reservation 4001 to the printer apparatus 300 on condition that the reader apparatus 200 has read two pages (two sheets) of the document.

On the other hand, if the control apparatus 110 is to execute a job using the print function to print the print data received from the external device via the network I/F 140, the control apparatus 110 performs raster image processing (RIP) of the received print data while analyzing the print data. The control apparatus 110 thus generates the image data. The control apparatus 110 identifies layout information of the print data by analyzing the print data. The layout information includes designation of one-sided/two-sided printing and reduction layout (i.e., 1-in-1 or 2-in-1) set using the external PC. Further, the control apparatus 110 rasterizes the print data and specifies the page of the image data to be printed according to the generated image data.

The control apparatus 110 then issues to the printer apparatus 300 the print reservation 4001 according to the identified layout information and the specified page. If the control apparatus 110 is to perform one-sided, 1-in-1 printing, the control apparatus 110 issues the print reservation 4001 to the printer apparatus 300 when one page of the image data has been generated. If the control apparatus 110 is to perform one-sided, 2-in-1 printing, the control apparatus 110 issues the print reservation 4001 to the printer apparatus 300 when two pages of the image data have been generated.

In the case where the copy function or the print function is to be performed, the control apparatus 110 also issues, when it is determined that one sheet is to be fed, the print reservation 4001 corresponding to the sheet to the printer apparatus 300.

The print reservation 4001 includes the information on the sheet feed cassette 311, 312, 313, 314, 401, 402, 403, 411, 412, 413, 421, 422, or 423 from which the sheet is to be fed. Further, if a shift sort mode is designated, the print reservation 4001 includes the information indicating a shift position. Furthermore, if a staple sort mode is designated, the print reservation 4001 includes a notification of performing stapling and information indicating a stapling position (i.e., upper left, lower left, upper right, or lower right). Moreover, if the sheet to be fed is the last sheet of the copy or the job, the print reservation 4001 includes information indicating thereof.

The control apparatus 110 repeats issuing such print reservations until the control apparatus 110 completes analysis of all pages in the received job.

Upon receiving the print reservation 4001, the CPU 301 in the printer apparatus 300 stores the received print reservation 4001 in a reservation cue included in the memory 302. If there is another print reservation previously stored in the reservation cue, the control apparatus 110 stores the print reservation subsequent to the stored print reservation. The print reservations thus stored in the reservation cue are managed in a stored order. The printer apparatus 300 sets a sheet feed schedule of the sheets according to the print reservations stored in the reservation cue. However, the actual order in which the sheets are fed is not necessary in the order of storing the print reservations in the reservation cue. The printer apparatus 300 determines the actual sheet feed timing according to the distance from the sheet feed cassette that feeds each sheet designated in the print reservation, to the transfer unit 325.

The RAM 150 in the control apparatus 110 also manages the reservation cue similar to the above-described reservation cue. The control apparatus 110 uses the reservation cue to manage the order of issuing the print reservations to the printer apparatus 300, and the sheets that have been fed. The control apparatus 110 and the printer apparatus 300 exchange the commands so that the reservation cue managed in the control apparatus 110 and the reservation cue managed in the printer apparatus 300 manage the same contents.

The printer apparatus 300 notifies the control apparatus 110 of a print reservation status 4002, when there is no error, such as a jam in the sheet conveyance path or toner run-out, and the print reservation of the next sheet can be received.

The printer apparatus 300 determines the sheet storing unit from which the sheet corresponding to the print reservation 4001 is to be fed, based on the information included in the print reservation 4001 stored in the reservation cue. The printer apparatus 300 then determines the sheet conveyance timing so that the interval between the sheets to be conveyed becomes shortest, and performs control to convey the sheets. For example, the printer apparatus 300 is to feed the sheets from the sheet feed cassette 311 and the sheet feed cassette 423. In such a case, if the printer apparatus 300 starts feeding the sheet from the sheet feed cassette 423 after actually feeding the sheet from the sheet feed cassette 311, the interval between the sheets becomes long. To solve such a problem, the printer apparatus 300 performs control so that the interval between the sheet that is fed from the sheet feed cassette 311 and conveyed to the sheet conveyance path 331, and the next sheet fed from the sheet feed cassette 423, becomes a predetermined interval. In other words, the printer apparatus 300 feeds the sheet from the sheet feed cassette 423 earlier than actually feeding the sheet from the sheet feed cassette 311. If the predetermined interval is set to the minimum interval in which the transfer unit 325 can continuously transfer the images to the sheets, the print speed can be improved.

Upon feeding the sheet designated by the print reservation 4001, the printer apparatus 300 notifies the control apparatus 110 of a sheet feed notification 4003 corresponding to the print reservation 4001.

Upon receiving the sheet feed notification 4003, the control apparatus 110 issues a print execution request 4004 to the printer apparatus 300. The print execution request 4004 is issued at the timing in which the developer (toner) is applied on the photosensitive drum 323 to transfer the image to the conveyed sheet corresponding to the print reservation 4001. The control apparatus 110 then transmits the generated image data to the printer apparatus 300.

After receiving the print execution request 4004, the printer apparatus 300 receives the image data and hard signal synchronization 4005 from the control apparatus 110. The printer apparatus 300 then applies the developer (toner) to the photosensitive drum 323 according to the received image data. The developer (toner) applied to the photosensitive drum 323 is transferred to the conveyed sheet, and the fixing unit 327 fixes the developer (toner) transferred to the sheet. The image is thus formed on the sheet.

If one-sided printing is to be performed on the sheet on which the image is formed, the printer apparatus 300 transmits to the control apparatus 110 a print result status 4006 at the timing of discharging the sheet to outside of the apparatus. Further, if two-sided printing is to be performed on the sheet on which the image is formed, the printer apparatus 300 transmits to the control apparatus 110 the print result status 4006 at the timing of conveying the sheet printed on one side to the conveyance path 333. When the printer apparatus 300 transmits the print result status 4006 to the control apparatus 110, the printer apparatus 300 deletes the print reservation corresponding to the print result status 4006 from the reservation cue in the memory 302.

The control apparatus 110 also deletes, when receiving the print result status 4006, the print reservation 4001 corresponding to the print result status 4006 from the reservation cue stored in the RAM 150.

The sequence for printing the image on one sheet is as described above.

The sequence for cancelling the print reservation for printing on one sheet will be described below with reference to FIG. 5. FIG. 5 is a schematic diagram illustrating a sequence performed between the control apparatus 110 and the printer 300. The process performed by the control apparatus 110 is realized by the CPU 120 in the control apparatus 110 executing the program stored in the ROM 160. Further, the process performed by the printer apparatus 300 is realized by the CPU 301 in the printer apparatus 300 executing the program stored in the memory 302.

Since the print reservation 4001 and the print reservation status 4002 are processes that are similar to those described with reference to FIG. 4, detailed description will be omitted.

If it then becomes necessary to cancel printing of the sheet corresponding to the print reservation 4001, the control apparatus 110 issues a print cancellation 4011 to the printer apparatus 300.

Upon receiving the print cancellation 4011, the printer apparatus 300 determines whether the sheet designated in the print reservation 4001 indicated by the print cancellation 4011 has been previously fed. If the sheet has been previously fed, the print reservation 4001 which designates feeding the sheet cannot be cancelled. The printer apparatus 300 thus notifies the control apparatus 110 of a print cancellation status 4012 that print cancellation has failed. Upon receiving the notification that print cancellation has failed, the control apparatus 110 issues the print execution request 4004 to the printer apparatus 300 as illustrated in FIG. 4, and continues performing the print sequence of the sheet.

On the other hand, if the sheet designated in the print reservation has not been fed when the printer apparatus 300 receives the print cancellation 4011, the printer apparatus 300 cancels the print reservation 4001 stored in the memory 302. More specifically, the printer apparatus 300 performs control so that the sheet designated in the print reservation 4001 is not fed. The printer apparatus 300 then notifies the control apparatus 110 of the print cancellation status 4012 that print cancellation is successful. Upon receiving the notification that print cancellation is successful, the control apparatus 110 interrupts the print sequence of the sheet. In such a case, the sheet designated in the print reservation 4001 is not fed.

Figure 6B:
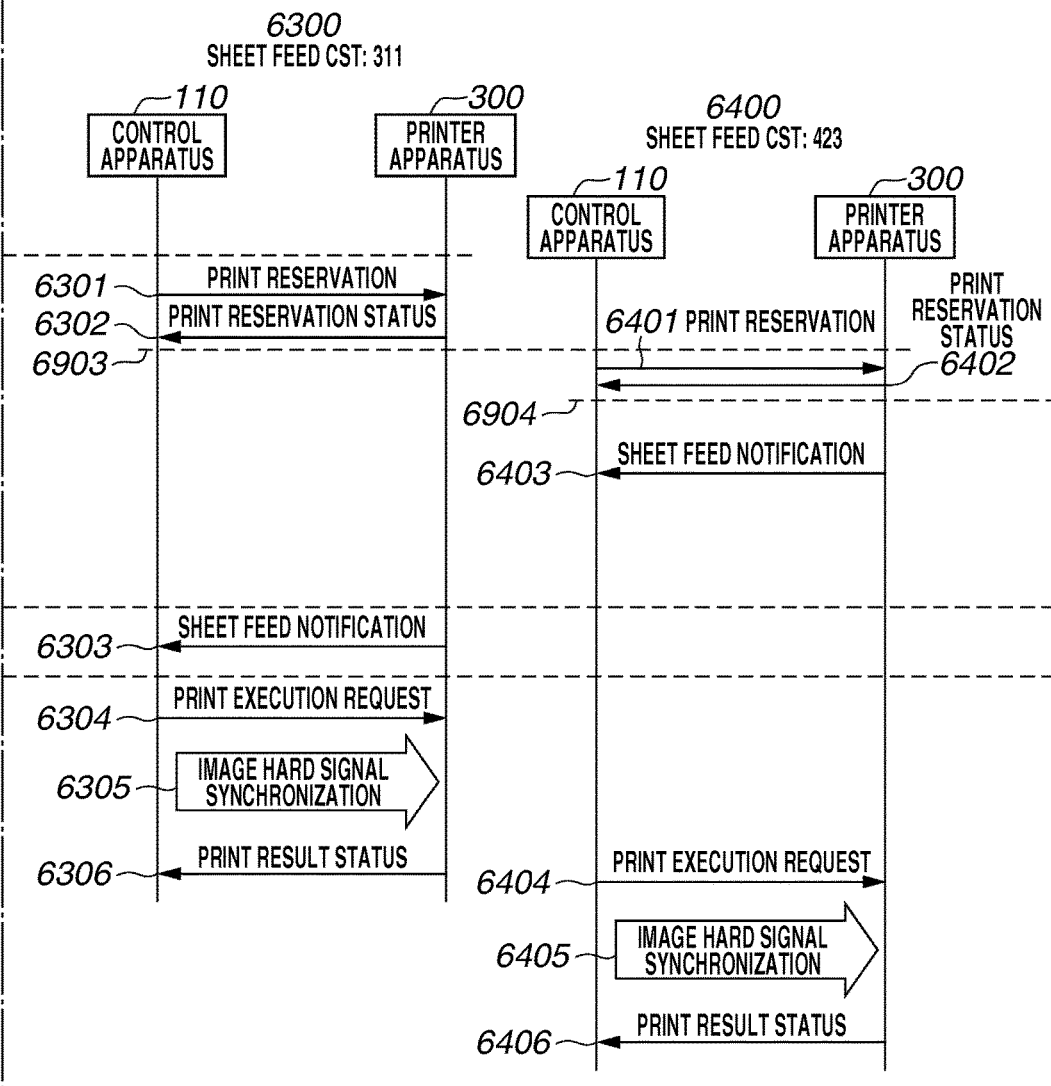
FIG. 6 includes FIGS. 6A, 6B, 6C, and 6D as a sequence diagram illustrating a process flow according to an exemplary embodiment.
Figure 6D:
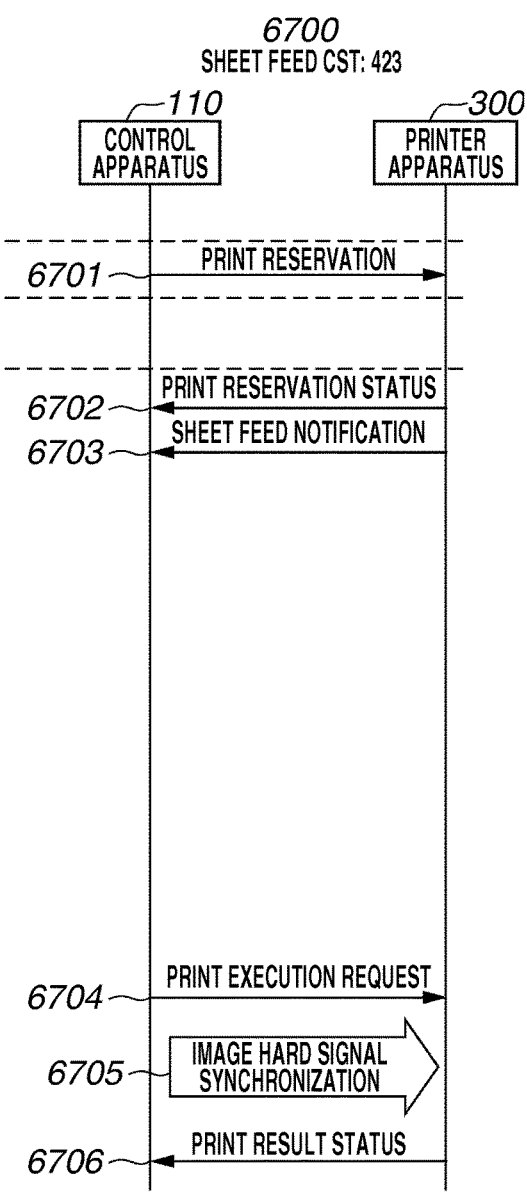

The sequence performed in a case where the images are to be printed on seven sheets will be described below with reference to FIG. 6. The process performed by the control apparatus 110 illustrated in FIG. 6 is realized by the CPU 120 in the control apparatus 110 executing the program stored in the ROM 160, similarly as in FIGS. 4 and 5. Further, the process performed by the printer apparatus 300 is realized by the CPU 301 in the printer apparatus 300 executing the program stored in the memory 302.

Sequences for feeding a first sheet 6100, a second sheet 6200, a third sheet 6300, a fourth sheet 6400, a fifth sheet 6500, a sixth sheet, 6600, and a seventh sheet 6700 are illustrated in order from the left side of the sequence diagram in FIG. 6. The first sheet 6100 and a third sheet 6300 are fed from the sheet feed cassette 311, and the other sheets are fed from the sheet feed cassette 423.

The sheet conveyance path from the sheet feed cassette 311 to the transfer unit 325 is the shortest conveyance path among the conveyance paths from the sheet feed cassettes included in the image forming apparatus 100. On the other hand, the sheet conveyance path from the sheet feed cassette 423 to the transfer unit 325 is the longest conveyance path among the conveyance paths from the sheet feed cassettes included in the image forming apparatus 100.

If printing is to be executed using the sheet feed cassette whose sheet conveyance path to the transfer unit 325 is short, and the sheet feed cassette whose sheet conveyance path to the transfer unit 325 is long as described above, the printer apparatus 300 feeds the sheets as illustrated in FIG. 6.

The control apparatus 110 and the printer apparatus 300 perform the sequence illustrated in FIG. 4 to feed the first sheet 6100. In other words, the control apparatus 110 and the printer apparatus 300 exchange the commands for issuing a print reservation 6101, a print reservation status 6102, a sheet feed notification 6103, a print execution request 6104, image data transfer/hard signal synchronization 6105, and a print result status 6106. Since the sequences for feeding the second, third, fourth, fifth, sixth, and seventh sheets are similar to the sequence for feeding the first sheet, description will be omitted.

The printer apparatus 300 feeds the first sheet 6100.

Upon receiving from the printer apparatus 300 the print reservation status 6102 with respect to the first sheet 6100, the control apparatus 100 transmits to the printer apparatus 300 print reservation 6201 of the next second sheet 6200.

The control apparatus 110 issues to the printer apparatus 300 the print reservation 6201 of the second sheet 6200 after receiving the print reservation status 6102 of the first sheet 6100, as indicated by a broken line 6901. The control apparatus 110 similarly repeats transmission of the print reservation and reception of the print reservation status for each of the second, third, fourth, fifth, sixth, and seventh sheets. Each of broken lines 6902, 6903, 6904, 6905, and 6096 respectively indicates that the print reservation of the next sheet is transmitted after receiving the print reservation status of the previous sheet.

The second sheet 6200 is fed from the sheet feed cassette 423. There is no other sheet existing between the transfer unit 325 and the sheet feed cassette 423, and the sheet conveyance path between the transfer unit 325 and the sheet feed cassette 423 is long. The printer apparatus 300 thus immediately feeds the second sheet 6200, and transmits a sheet feed notification 6203 to the control apparatus 110.

The third sheet 6300 is fed from the sheet feed cassette 311. The third sheet 6300 is not immediately fed even when the image data to be formed on the sheet has been prepared. If the third sheet 6300 reaches the transfer unit 325 before the sheet fed from the sheet feed cassette 423, the discharge order of the sheets becomes the one that is not intended by the user. The third sheet 6300 thus cannot overtake the second sheet 6200. As a result, the printer apparatus 300 feeds the third sheet 6300 so that the third sheet 6300 is guided to the transfer unit 325 after a predetermined interval from when the second sheet 6200 fed from the sheet feed cassette 423 is guided to the transfer unit 325.

A fourth sheet 6400 is fed in advance before the third sheet 6300 is fed, instead of being fed after the third sheet 6300 is actually fed. The interval between the fourth sheet 6400 and the third sheet 6300 is thus prevented from becoming excessively long. If the third sheet has passed through a sheet merging portion 355 illustrated in FIG. 2, the fourth sheet 6400 can be guided to the sheet merging portion 355 after a predetermined interval from the third sheet 6300. Further, since the conveyance path from the sheet feed cassette 423 to the transfer unit 325 is long, the printer apparatus 300 may retain the fourth sheet 6400 between the sheet feed cassette 423 and the sheet merging portion 355 until the third sheet 6300 passes through the sheet merging portion 355.

The fifth sheet and the sixth sheet are fed from the sheet feed cassette 423 after a predetermined interval from the fourth sheet 6400. Since the conveyance path from the sheet feed cassette 423 to the transfer unit 325 is long, the printer apparatus 300 can retain the fifth sheet and the sixth sheet upstream from the fourth sheet 6400 while retaining the fourth sheet 6400.

Upon receiving a print reservation 6701 of the seventh sheet 6700, the printer apparatus 300 does not immediately notify the control apparatus 110 of a print reservation status 6702 as indicated by the broken line 6908. The printer apparatus 300 notifies the control apparatus 110 of the print reservation status 6702 after notifying the control apparatus 110 of a print result status 6106 of the first sheet 6100. The printer apparatus 300 is thus prevented from receiving the print reservations excessively. In other words, FIG. 6 illustrates an example in which the printer apparatus 300 can receive the print reservation for six sheets.

Figure 7:
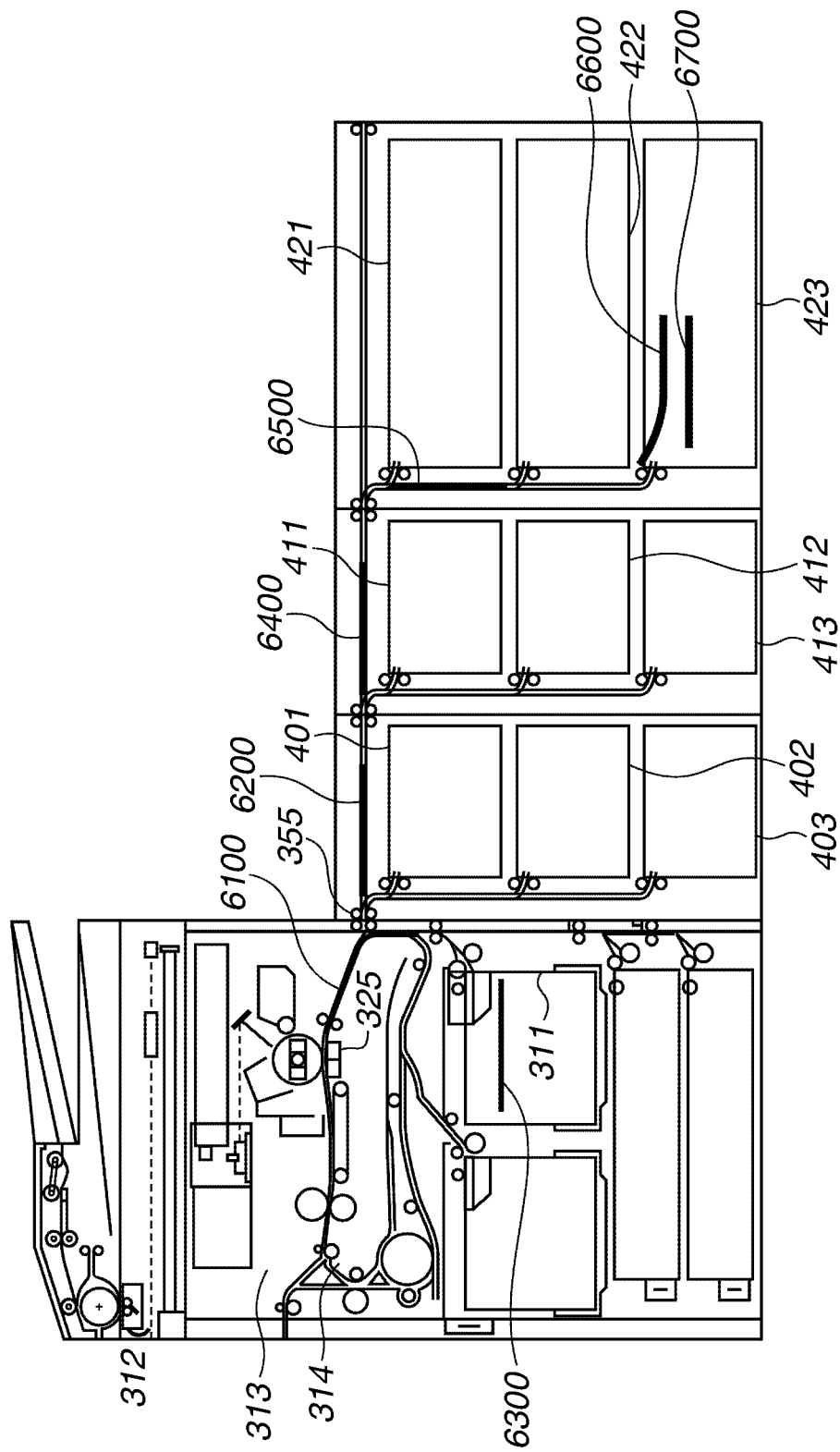
FIG. 7 illustrates sheet conveyance according to an exemplary embodiment.

FIG. 7 illustrates a conveyance state of the sheet corresponding to a broken line 6907 in the sequence diagram illustrated in FIG. 6. The broken line 6907 indicates the control apparatus 110 receiving a sheet feed notification 6603 from the printer apparatus 300 that has fed the sixth sheet 6600. Further, the sheets 6100, 6200, 6300, 6400, 6500, 6600, and 6700 are illustrated by thick lines.

The first sheet 6100 is retained in the conveyance path from the transfer unit 325 to the sheet feed cassette 311. The second sheet 6200 is retained in the conveyance path of the sheet feed deck 400 among the conveyance path from the transfer unit 325 to the sheet feed cassette 423. The third sheet 6300 is not yet fed from the sheet feed cassette 311. The fourth sheet 6400 is fed earlier than the third sheet and is retained in the conveyance path of the sheet feed deck 410 disposed upstream from the retaining position of the second sheet, among the conveyance path from the transfer unit 325 to the cassette 423. The fifth sheet 6500 is retained in the conveyance path of the sheet feed deck 420 disposed upstream from the retaining position of the fourth sheet 6400, among the conveyance path from the transfer unit 325 to the cassette 423. The sixth sheet 6600 is retained in the conveyance path of the sheet feed deck 420 disposed upstream from the retaining position of the fifth sheet 6500, among the conveyance path from the transfer unit 325 to the cassette 423. The seventh sheet 6700 is not yet fed from the sheet feed cassette 423 to the printer apparatus 300.

If the configuration in which the sheet conveyance path is short, such as from the transfer unit 325 to the sheet feed cassette 311, is combined with the configuration in which the sheet conveyance path is long, such as from the transfer unit 325 to the sheet feed cassette 423, the above-described control is performed. The intervals between the conveyed sheets can thus become short. For example, a sheet (i.e., the third sheet) is fed from the sheet feed cassette 311, and the next sheet (i.e., the fourth sheet) is fed from the sheet feed cassette 423. In such a case, if the next sheet (i.e., the fourth sheet) is fed after the sheet (i.e., the third sheet) is fed from the sheet feed cassette 311, there is a long interval between the sheet (i.e., the third sheet) and the next sheet (i.e., the fourth sheet). However, if the printer apparatus 300 previously receives a plurality of print reservations and schedules the sheets to be fed as described above, printing can be performed by shortening the interval between the sheets. The printing performance can thus be improved.

Figure 8A:
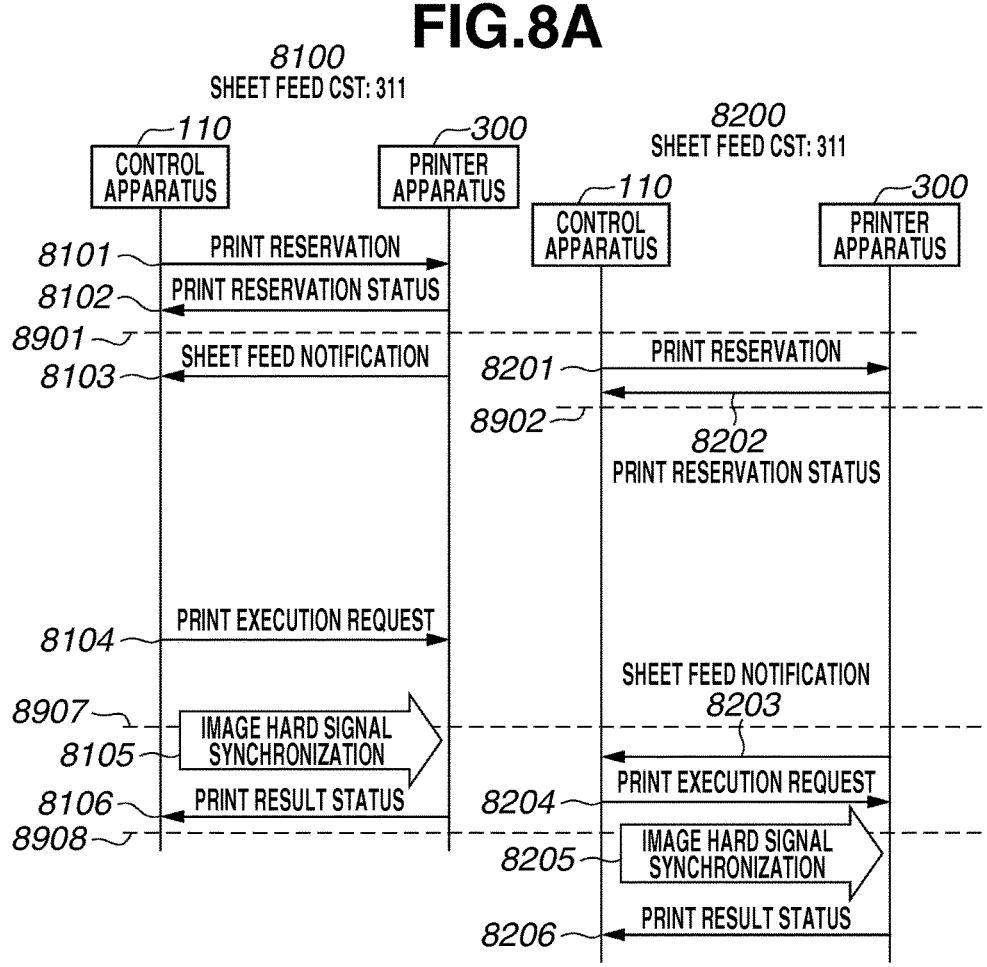
FIG. 8 includes FIGS. 8A, 8B, 8C, and 8D as a sequence diagram illustrating a process flow according to an exemplary embodiment.
Figure 8:
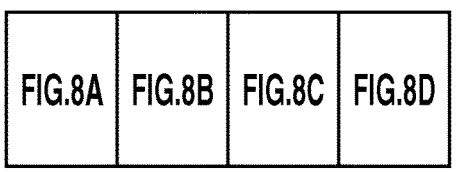
Figure 8B:
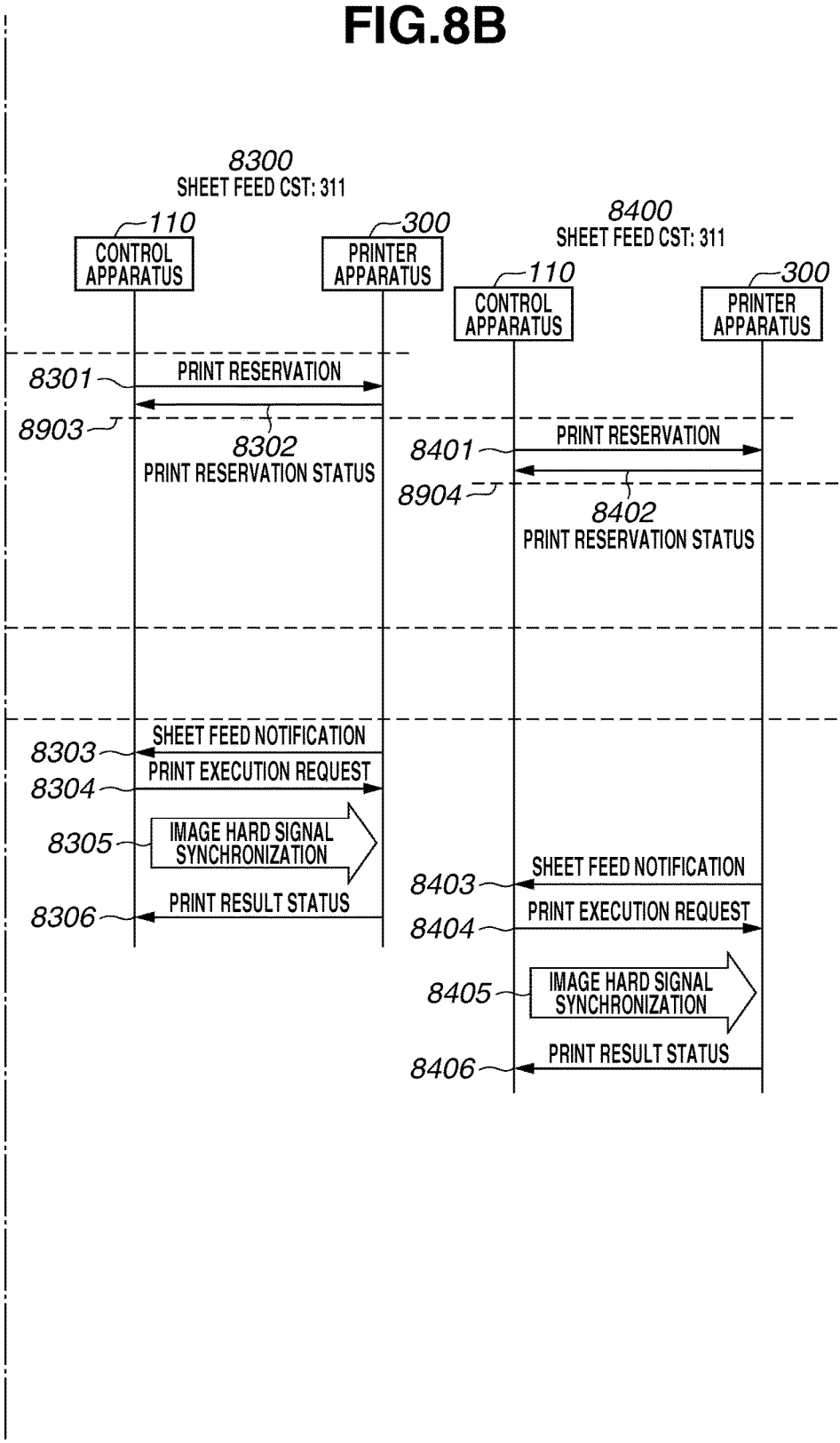
Figure 8C:
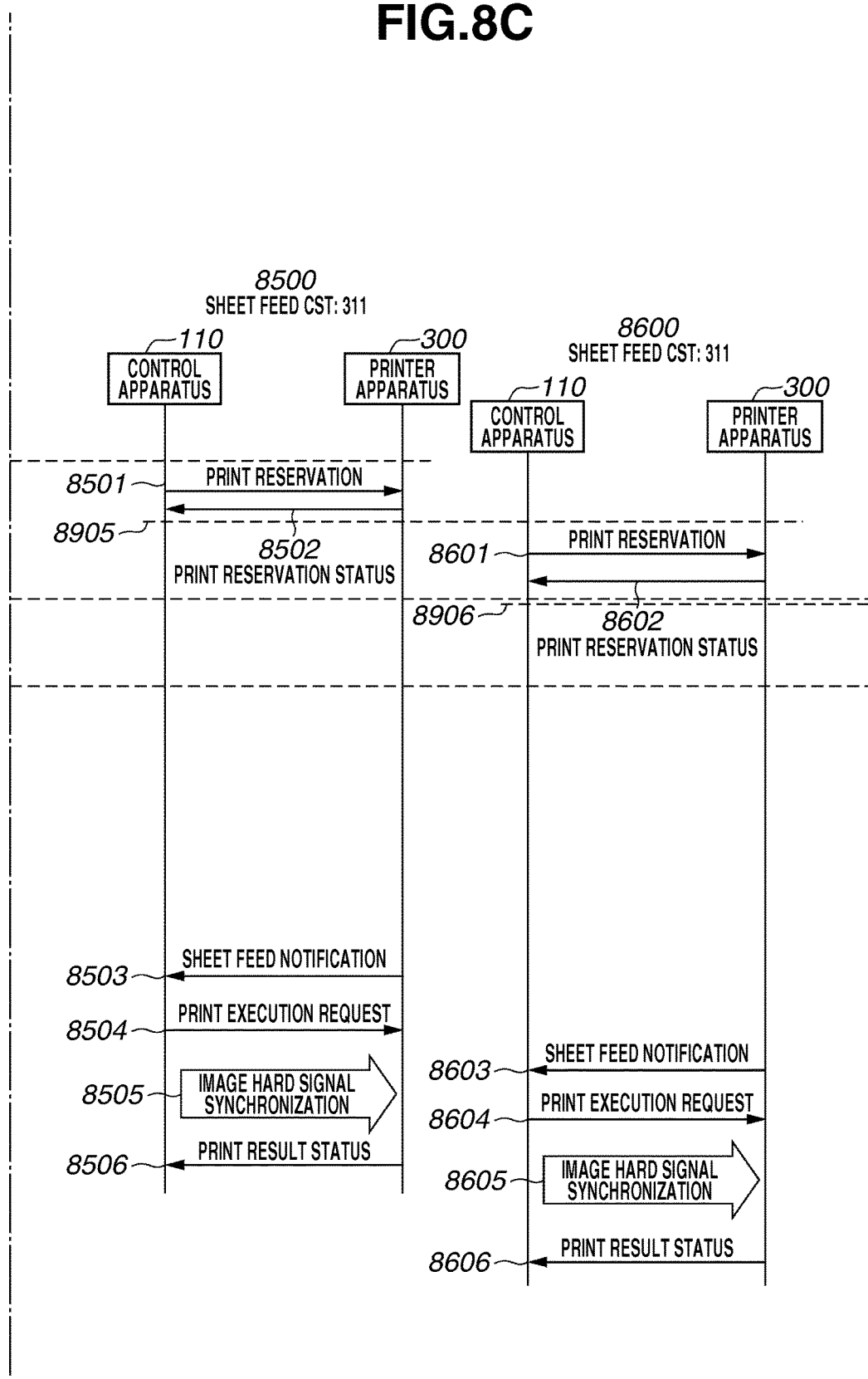

An example of feeding all seven sheets from the sheet feed cassette 311 in the image forming apparatus 100 will be described below with reference to FIG. 8. The process performed by the control apparatus 110 illustrated in FIG. 8 is realized by the CPU 120 in the control apparatus 110 executing the program stored in the ROM 160, similarly as in FIGS. 4 and 5. Further, the process performed by the printer apparatus 300 is realized by the CPU 301 in the printer apparatus 300 executing the program stored in the memory 302.

Referring to FIG. 8, when a first sheet 8100 is fed, the first sheet 8100 is retained in the conveyance path from the transfer unit 325 to the sheet feed cassette 311. Subsequent sheets 8200, 8300, 8400, 8500, 8600, and 8700 thus cannot be immediately fed.

In such a case, the printer apparatus 300 notifies the control apparatus 110 of the print reservation status each time the printer apparatus 300 receives the print reservation, so that the printer apparatus 300 can receive the print reservations of the subsequent sheets. Since the subsequent sheets may be fed from the sheet feed cassette 423 whose sheet conveyance path from the transfer unit 325 is long, it is necessary for the printer apparatus 300 to immediately receive the print reservations of the subsequent sheets to promptly feed such sheets.

The printer apparatus 300 thus receives from the control apparatus 110 the print reservations of the first, second, third, fourth, fifth, and sixth sheets. As illustrated in FIG. 8, when the printer apparatus 300 has notified the control apparatus 110 of a print reservation status 8602 of the sixth sheet 8600, the printer apparatus 300 has not yet actually fed the second sheet 8200, the third sheet 8300, the fourth sheet 8400, the fifth sheet 8500, and the sixth sheet 8600.

FIG. 9 illustrates the conveyance state of the sheet corresponding to the timing indicated by a broken line 8905 in the sequence illustrated in FIG. 8.

Referring to FIG. 9, the first sheet 8100 is retained in the conveyance path from the transfer unit 325 to the cassette 311. The second sheet 8200, the third sheet 8300, the fourth sheet 8400, the fifth sheet 8500, and the sixth sheet 8600 are sheets to be fed from the sheet feed cassette 311. However, since the first sheet 8100 exists in the sheet conveyance path from the transfer unit 325 to the sheet feed cassette 311 even when the sheets are to be fed from the sheet feed cassette 311, the sheets cannot be immediately fed.

Further, a print reservation 8701 with respect to the seventh sheet 8700 is not yet issued from the control apparatus 110, so that the seventh sheet 8700 is not fed from the sheet feed cassette 311.

As described above with reference to FIGS. 6, 7, and 8, the interval between the sheets can be shortened in the image forming apparatus 100 including the sheet feed cassette 423 whose distance to the transfer unit 325 is long, and the sheet feed cassette 311 whose distance to the transfer unit 325 is short, by managing the print reservations.

More specifically, upon receiving the print reservation corresponding to the sheet to be fed, the printer apparatus 300 inputs the print reservation to the reservation cue and manages the print reservation until actually feeding the sheet. The printer apparatus 300 then sets the schedule for feeding the sheets according to the information included in the print reservations input to the reservation cue.

However, if the image forming apparatus 100 receives a job in which interrupt is designated (i.e., the interrupt job), the output of the sheets to be printed may be delayed by execution of the interrupt job.

The interrupt designation can be made by the user pressing the interrupt key 606 illustrated in FIG. 3. If the user presses the start key 607 to instruct execution of the job while pressing the interrupt key 606, the control apparatus 110 interrupts analysis of the job being executed and generation of the image data. The control apparatus 110 then performs control so that the job which is interrupt-designated is executed in preference to the interrupted job. If the interrupt job is input, the control apparatus 110 stops analysis of the job that has been interrupted (i.e., interrupted job), so that the print reservation of the interrupted job is not input to the reservation cue. The interrupted job may be a print job input from the external PC, or a copy job in which the reader apparatus 200 has completed reading. Upon interrupting the job being executed, the control apparatus 110 reads the image of the document of the interrupt job using the reader apparatus 200, and stores the image data in the HDD 130. The control apparatus 110 then prints the image using the printer apparatus 300 according to the image data stored in the HDD 130. The user can receive the printed product corresponding to the interrupt-designated job without waiting for completion of the job being executed, or printing the images of all pages of the preceding job which is standing by to be executed, by executing the interrupt job. According to the above-described example, the user presses the interrupt key 606 disposed in the operation unit 170 in the image forming apparatus 100. However, a key similar to the interrupt key 606 may be disposed in a display unit of the external PC, and the print data transmitted from the external device may be interrupt-designated and printed.

Conventionally, when the user instructs executing the interrupt job, the sheets which have been previously print-reserved are printed as it is, so that the user cannot receive the printed product corresponding to the interrupt job until all print-reserved sheets are printed. In such a case, the time between instructing the interrupt job and printing the product corresponding to the interrupt job, becomes longer as the number of print reservations stored in the reservation cue increases. As a result, even if the user desires to urgently receive the printed product and thus designates interruption, a long time becomes necessary to receive the printed product by executing the interrupt job.

If the print reservations are stored in the reservation cue and a large number of sheets have not been actually fed, a long time becomes necessary for the printer apparatus 300 to print the product corresponding to the interrupt job after the user instructs execution of the interrupt job. This is as illustrated in the examples of FIGS. 8 and 9.

Figure 10:
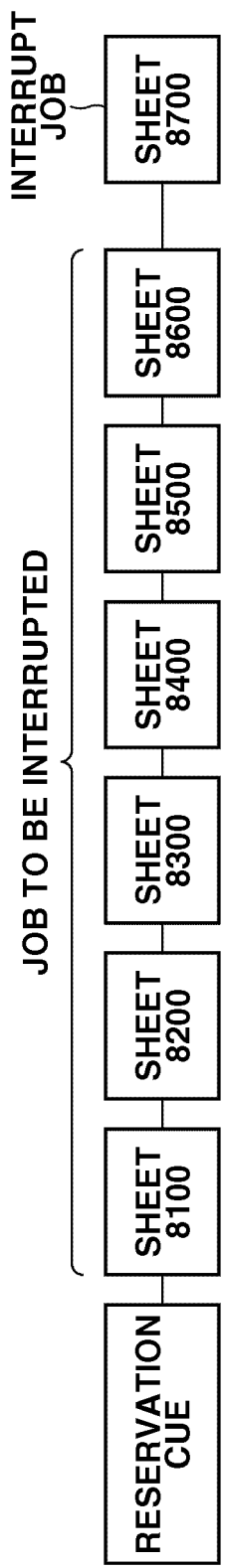
FIG. 10 illustrates a sheet feed reservation state according to an exemplary embodiment.

Such a state will be described below with reference to FIG. 10. FIG. 10 illustrates the state of the reservation cue stored in the memory 302 in the printer apparatus 300.

Referring to FIG. 10, the print reservations 8100, 8200, 8300, 8400, 8500, and 8600 respectively of the first, second, third, fourth, fifth, and sixth sheets are stored in the reservation cue as the jobs to be interrupted. Further, the first, second, third, fourth, fifth, and sixth sheets have not been actually fed.

If the user then instructs execution of the interrupt job in such a state, the control apparatus 110 recognizes that the execution of the interrupt job has been instructed. The control apparatus 110 then issues to the printer apparatus 300 the print reservation 8700 for executing the interrupt job.

However, the print reservations 8100, 8200, 8300, 8400, 8500, and 8600 of the interrupted jobs are previously stored in the reservation cue when the control apparatus 110 issues the print reservation 8700. The sheet designated in the print reservation 8700 thus cannot be fed until the sheets designated by the previously stored print reservations have been fed.

To solve such a problem, according to the present exemplary embodiment, the method illustrated in FIG. 5 is employed. In other words, if the control apparatus 110 receives the interrupt job, the control apparatus 110 cancels the print reservations stored in the reservation cue in the printer apparatus 300 and performs the print reservation of the interrupt job.

An example of such a process will be described below with reference to FIGS. 11A, 11B, 11C, 11D, and 11E. FIGS. 11A, 11B, 11C, 11D, and 11E illustrate the states of the reservation cue stored in the memory 302 in the printer apparatus 300 and the print reservation for printing the sheet of a new interrupt job.

Referring to FIG. 11A, print reservations 1200, 12200, 12300, 12400, 12500, and 12600 respectively of the first, second, third, fourth, fifth, and sixth sheets, i.e., the job to be interrupted, are issued and stored in the reservation cue. In such a state, the control apparatus 110 receives the instruction to execute the interrupt job. The control apparatus 110 thus generates in the RAM 150, print reservation 12700 of a sheet as the new interrupt job, to be issued to the printer apparatus 300.

The control apparatus 110 then instructs the printer apparatus 300 to cancel the print reservation from the last sheet in the job to be interrupted.

FIG. 11B illustrates a state in which the print reservation 12600 of the sixth sheet, i.e., the last sheet in the job to be interrupted, has been cancelled. The print reservation of the last sheet in the job to be interrupted is cancelled to prevent lacking of the sheet in the printed product of the interrupted job. If the sheets are to be fed from both the sheet feed cassette whose conveyance path from the transfer unit 325 is short and from the cassette whose conveyance path from the transfer unit 325 is long, the order of the print reservations and the order of actual feeding of the sheets become different. The print reservation of the last sheet in the job to be interrupted is thus cancelled. Referring to FIG. 6, if the first sheet 6100 and the third sheet 6300 are fed from the sheet feed cassette 311, and the remaining second, fourths, fifth, sixth, and seventh sheets are fed from the sheet feed cassette 423, the third sheet 6300 is not fed at the timing indicated by the broken line 6907.

If the print reservations are cancelled from the top of the reservation cue in such a state, only the print reservation of the third sheet may be successfully cancelled, and the print reservations of the fourth, fifth, and sixth sheets may not be cancelled. As a result, the fourth, fifth, and sixth sheets become printed after the first and second sheets, and since the sheets are sequentially discharged, there is a lack in the sheet in the printed product. To prevent such lacking of the sheet in the printed product, the print reservations are cancelled from the print reservation of the trailing sheet.

When cancelling the print reservations, the printer apparatus 300 saves the information about the cancelled print reservations in a region in the memory 302 separately set from the reservation cue. The saved print reservation information is used for generating the print reservations of the sheets in the interrupted job after generating the print reservation of the interrupt job.

The printer apparatus 300 cancels the print reservation of the last sheet in the job to be interrupted. If cancellation is successful, the printer apparatus 300 cancels the print reservation of the newly set last sheet after cancelling the previous print reservation. If the printer apparatus 300 receives the instruction to cancel the print reservation, the printer apparatus 300 can cancel the print reservation of the sheet that has not been actually fed. However, if the sheet has been already fed, the print reservation of such a sheet cannot be cancelled.

If the printer apparatus 300 receives from the control apparatus 110 an instruction to cancel printing after the third sheet of the job to be interrupted has been actually fed, the printer apparatus 300 notifies the control apparatus 110 as a print cancellation status that cancelling is unsuccessful.

FIG. 11C illustrates a state in which the print reservations of the sheets in the interrupted job have been cancelled in order from the rear sheet. Further, FIG. 11C illustrates the state in which cancelling of the print reservation 12300 of the third sheet in the job to be interrupted has failed.

FIG. 11D illustrates a state in which the control apparatus 110 has issued to the printer apparatus 300, the print reservation 12700 of the sheet in the interrupt job when the print reservations of the sheets in the interrupted job have been cancelled. As a result, the sheet in the interrupt job is output after the third sheet in the interrupted job.

FIG. 11E illustrates a state of the reservation cue in which print reservations 12400, 12500, and 12600 of the interrupted job that have been saved are re-input. The print reservations are re-input to restart printing of the sheets in the interrupted job after completing execution of the interrupt job. The printer apparatus 300 inputs the print reservations 12400, 12500, and 12600 of the sheets in the interrupted job that have been previously cancelled, after issuing the print reservation 12700 of the sheet in the interrupt job. Further, if there are six or more sheets in the interrupted job, the control apparatus 110 issues to the printer apparatus 300 the print reservations of the sheets subsequent to the above-described sheets.

A control performed between the control apparatus 110 and the printer apparatus 300 to cancel the print reservation stored in the reservation cue will be described below with referent to FIG. 12 when the control apparatus 110 receives an instruction to execute the interrupt job. The process performed by the control apparatus 110 is realized by the CPU 120 in the control apparatus 110 executing the program stored in the ROM 160. Further, the process performed by the printer apparatus 300 is realized by the CPU 301 in the printer apparatus 300 executing the program stored in the memory 302.

Figure 12A:
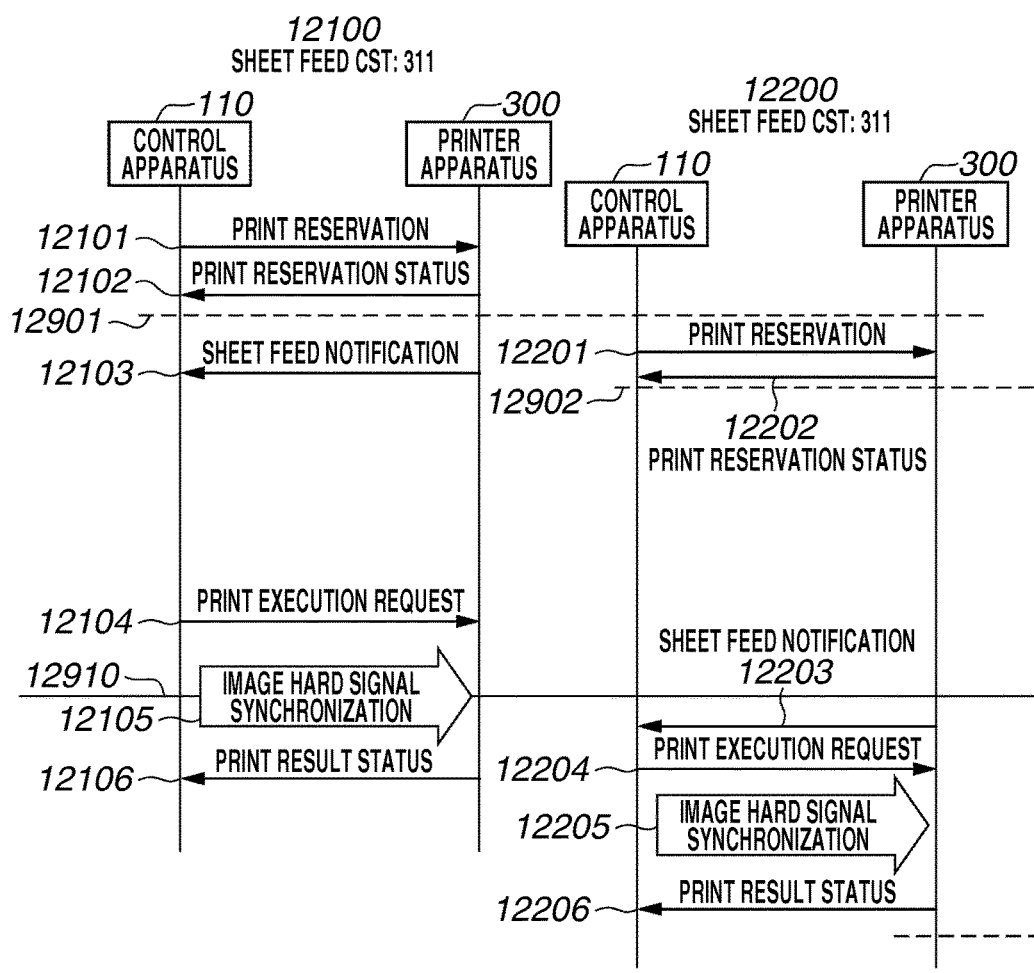
FIG. 12 includes FIGS. 12A, 12B, 12C, and 12D as a sequence diagram illustrating a process flow according to an exemplary embodiment.
Figure 12:
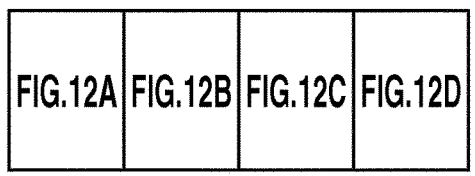
Figure 12B:
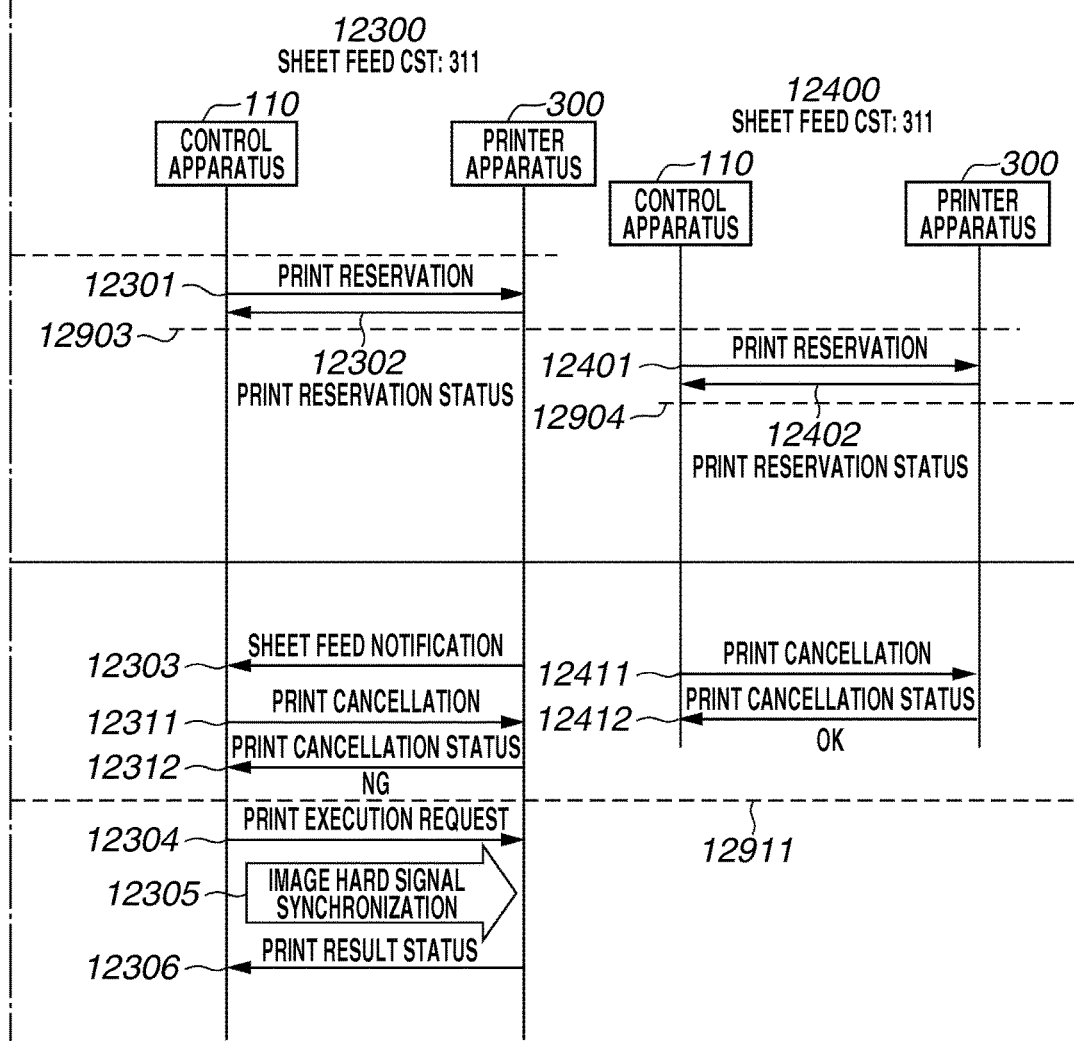
Figure 12C:
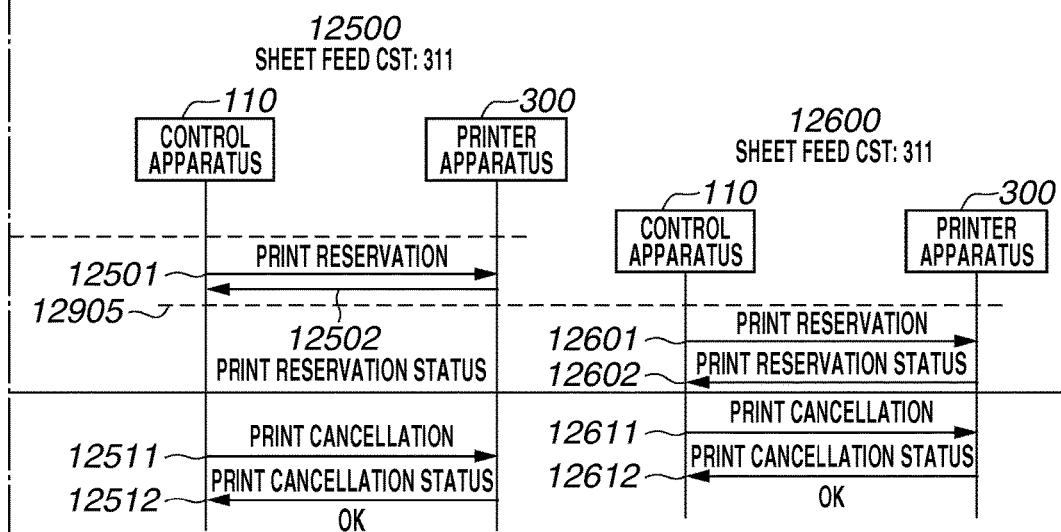
Figure 12D:
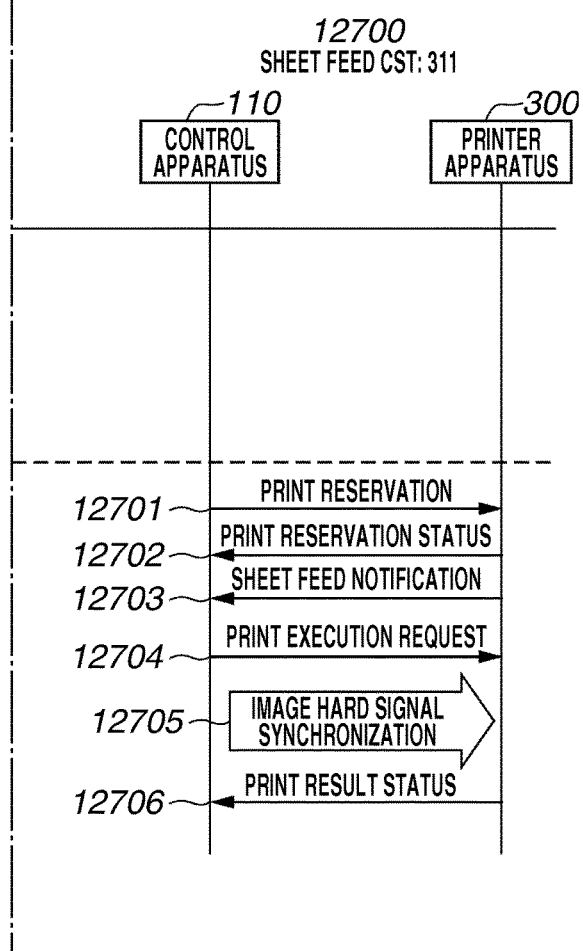

Referring to FIG. 12, a broken line 12910 indicates the timing corresponding to FIG. 11A. In other words, the control apparatus 110 receives at such timing, the instruction to execute the interrupt job after receiving from the printer apparatus 300 a print reservation status 12602 of the sixth sheet 12600.

Upon receiving the instruction to execute the interrupt job, the control apparatus 110 issues to the printer apparatus 300, print cancellation 12611 with respect to the print reservation 12600 of the last sheet in the interrupted job. Since the printer apparatus 300 has not yet fed the sheet corresponding to the print reservation 12600, the printer apparatus 300 can cancel the print reservation. The printer apparatus 300 thus notifies the control apparatus 110 of successful cancelling of the print reservation by transmitting "print cancellation status OK" 12612.

Upon receiving the "print cancellation status OK" 12612 with respect to the print reservation 12600, the control apparatus 110 issues print cancellation 12511 with respect to the print reservation 12500 of the next last sheet in the interrupted job.

Since the printer apparatus 300 has not yet fed the sheet corresponding to the print reservation 12500, the printer apparatus 300 notifies the control apparatus 110 of successful cancelling of the print reservation by transmitting "print cancellation status OK" 12512.

The printer apparatus 300 also receives from the control apparatus 110 print cancellation 12411 with respect to the sheet designated in the print reservation 12400. The printer apparatus 300 thus notifies the control apparatus 110 by transmitting "print cancellation status OK" 12412, similarly to the sheet designated by the print reservation 12500.

Upon receiving the "print cancellation status OK" 12412, the control apparatus 110 issues print cancellation 12311 with respect to the print reservation 12300 of the next last sheet in the interrupted job. Since the printer apparatus 300 has previously fed the sheet corresponding to the print reservation 12300, the printer apparatus 300 cannot cancel the print reservation. The printer apparatus 300 thus notifies the control apparatus 110 by transmitting "print cancellation status NG" 12312, indicating that the print cancellation has failed.

Upon receiving the "print cancellation status NG" 12312, the control apparatus 110 determines that the print reservation cancellation has failed, and thus continues to print the third sheet. More specifically, the control apparatus 110 issues a print execution request 12304 with respect to the sheet corresponding to the print reservation 12300, and continues the normal print sequence for the third sheet and preceding ones.

The control apparatus 110 determines at the same time that the print reservation of the interrupted jobs cannot be further cancelled. As a result, the control apparatus 110 issues to the printer apparatus 300, print reservation 12701 of the sheet 12700 in the interrupt job and executes the interrupt job.

Figure 13:
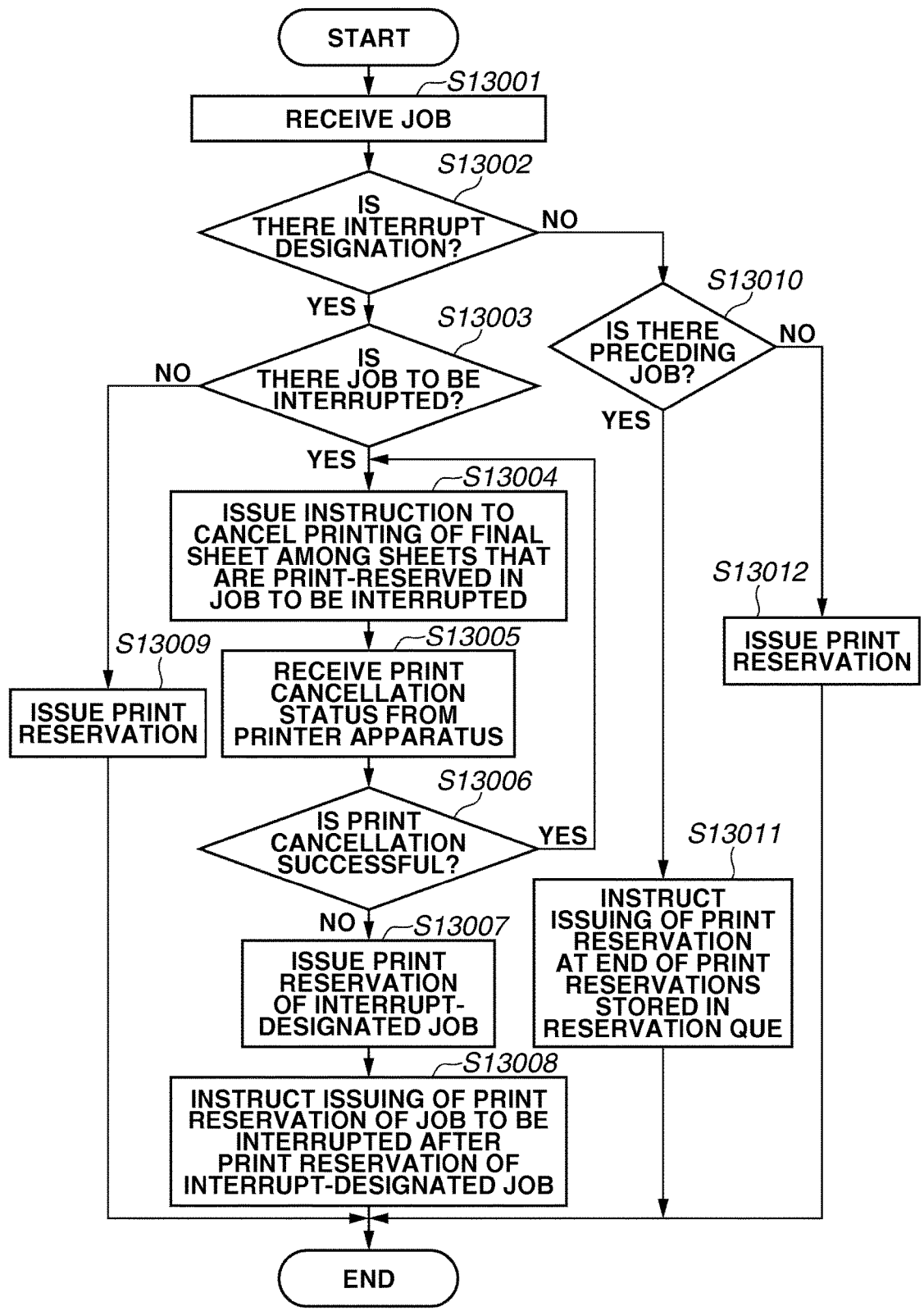
FIG. 13 is a flowchart illustrating an example of control performed according to an exemplary embodiment.

A process procedure performed by the control apparatus 110 according to the present exemplary embodiment will be described below with reference to FIG. 13. Each of the steps illustrated in FIG. 13 is realized by the CPU 120 in the control apparatus 110 reading and executing the programs stored in the ROM 160.

In step S13001, the control apparatus 110 receives a job. The received job may be a copy job employing the copy function, or a print job employing the print function.

In step S13002, the control apparatus 110 determines whether there is an interrupt designation in the received job. For example, if the job employs the copy function, the control apparatus 110 determines that the received job includes the interrupt designation in the case where the user presses the start key 607 while pressing the interrupt key 606. If the control apparatus 110 determines that there is the interrupt designation (YES in step S13002), the process proceeds to step S13003. On the other hand, the control apparatus 110 determines that the received job includes no interrupt designation in the case where the user presses the start key 607 while the interrupt key 606 is not pressed. If there is no interrupt designation (NO in step S13002), the process proceeds to step S13010.

On the other hand, if the job employs the print function, the control apparatus determines whether there is the interrupt designation in the print setting of the received print data. In such a case, if the control apparatus 110 determines that the received print data includes the interrupt designation setting (YES in step S13002), the process proceeds to step S13003. If there is no interrupt designation setting (NO in step S13002), the process proceeds to step S13010.

In step S13010, the control apparatus 110 determines whether there is a preceding job that has been input to the image forming apparatus 110 previous to the job to be input. More specifically, the control apparatus 110 determines whether the print reservation for performing the preceding job is stored in the reservation cue. If the control apparatus 110 determines that the print reservation is stored in the reservation cue (YES in step S13010), it is determined that there is a preceding job, and the process proceeds to step S13011. In step S13011, the control apparatus 110 instructs generation of the print reservation at the bottom of the reservation cue storing the print reservations. On the other hand, if there is no preceding job (NO in step S13010), the process proceeds to step S13012. In step S13012, the control apparatus 110 performs control to issue the print reservation. In such a case, since there is no interrupt designation, the printer apparatus 300 inputs the received print reservation to the reservation cue, feeds the sheet according to the print reservation input to the reservation cue, and prints the image.

In step S13003, the control apparatus 110 determines whether there is a job to be interrupted that has been input to the image forming apparatus 100 previous to the interrupt job. If there is the job to be interrupted (YES in step S13003), the process proceeds to step S13004. If there is no job to be interrupted (NO in step S13003), the process proceeds to step S13009.

In step S13009, the control apparatus 110 issues the print reservation to the printer apparatus 300. Since there is no print reservation in the reservation cue, the control apparatus 110 issues to the printer apparatus 300 the print reservation of the job in which there is interrupt designation. The printer apparatus 300 then inputs the received print reservation to the reservation cue. The printer apparatus 300 then feeds the sheet according to the print reservation input to the reservation cue, and prints the image.

In step S13004, the control apparatus 110 issues to the printer apparatus 300, a print cancellation instruction with respect to the last sheet among the sheets that have been print-reserved in the job to be interrupted.

In step S13005, the control apparatus 110 stands by to receive from the printer apparatus 300 the print cancellation status with respect to the print cancellation instruction issued in step S13004. The process then proceeds to step S13006.

In step S13006, the control apparatus 110 determines the result of the print cancellation status received from the printer apparatus 300 in step S13005. If the control apparatus 110 determines that the print cancellation is successful (YES in step S13006), the process returns to step S13004. If the control apparatus 110 determines that the print cancellation is unsuccessful (NO in step S13006), the process proceeds to step S13007.

In step S13007, the control apparatus 110 issues to the printer apparatus 300 the print reservation of the sheet corresponding to the interrupt job.

In step 13008, the control apparatus 110 instructs generation of the print reservation for the interrupted job following the print reservation for the interrupt-designated job. The process then ends.

According to the above-described control method, if the image forming apparatus which performs print reservation of the sheets receives from the user the instruction to execute the interrupt job, the image forming apparatus can promptly execute the interrupt job. More specifically, if the control apparatus 110 receives the interrupt-designated job, the execution of the interrupt job can be accelerated by the printer apparatus 300 cancelling the print reservation of the sheets that have not been actually fed. As a result, the user can quickly receive the printed product of the interrupt job.

A second exemplary embodiment will be described below. According to the first exemplary embodiment, if the image forming apparatus receives the interrupt-designated job, the image forming apparatus cancels the print reservation of the job to be interrupted, and generates the print reservation of the interrupt-designated job.

According to the second exemplary embodiment, control performed when the above-described interrupted job is designated to perform stapling will be described below.

If the interrupt job is executed with respect to the staple job being executed, it is necessary to execute the interrupt job at appropriate timing. In other words, if the interrupt job is executed in the middle of a staple bundling, the printed product of the interrupt job becomes mixed in the printed product of the interrupted job, so that correct stapling cannot be performed.

Such a state will be described below with reference to FIGS. 14A and 14B.

Referring to FIG. 14A, the print instruction of the first sheet 12100, the second sheet 12200, the third sheet 12300, the fourth sheet 12400, the fifth sheet 12500, and the sixth sheet 12600 are issued as the job to be interrupted, and are stored in the reservation cue. The job to be interrupted is a staple job, and the first sheet 12100, the second sheet 12200, the third sheet 12300, the fourth sheet 12400, the fifth sheet 12500, and the sixth sheet 12600 are designated to be stapled as one bundle in the printed product. In such a case, the print reservation of the sixth sheet 12600 includes the information indicating that the sheet bundle discharged to the stack tray 505 is to be stapled. The print reservation of the sixth sheet 12600 also includes a sheet discharge request for discharging the sheet bundle to the sheet discharge tray 507 after being stapled.

The printed product corresponding to the interrupt job becomes mixed in the printed product corresponding to the interrupted job by issuing the print reservation of the sheet in the interrupt job. The print reservation of the sheet in the interrupt job thus cannot be issued between the first sheet 12100, the second sheet 12200, the third sheet 12300, the fourth sheet 12400, the fifth sheet 12500, and the sixth sheet 12600.

FIG. 14B illustrates a case where the print reservation of the sheet in the interrupt job is issued between the first sheet 12100, the second sheet 12200, the third sheet 12300, the fourth sheet 12400, the fifth sheet 12500, and the sixth sheet 12600. More specifically, FIG. 14B illustrates the reservation cue in the case where the print reservation of the interrupted job is cancelled when the interrupt job is input, similarly to the first exemplary embodiment. If the print reservation which is issued with respect to the interrupted job is cancelled, the print reservation of the sheet in the interrupt job is issued at an interrupt position that is not originally intended by the user. The sheets corresponding to the interrupt job are thus output mixing with the sheets corresponding to the interrupted job.

According to the second exemplary embodiment, the time necessary for outputting the printed product corresponding to the interrupt job is reduced. Further, the second exemplary embodiment describes a method for preventing the printed product corresponding to the interrupt job from being output mixing with the printed product of the interrupted job.

Figure 15:
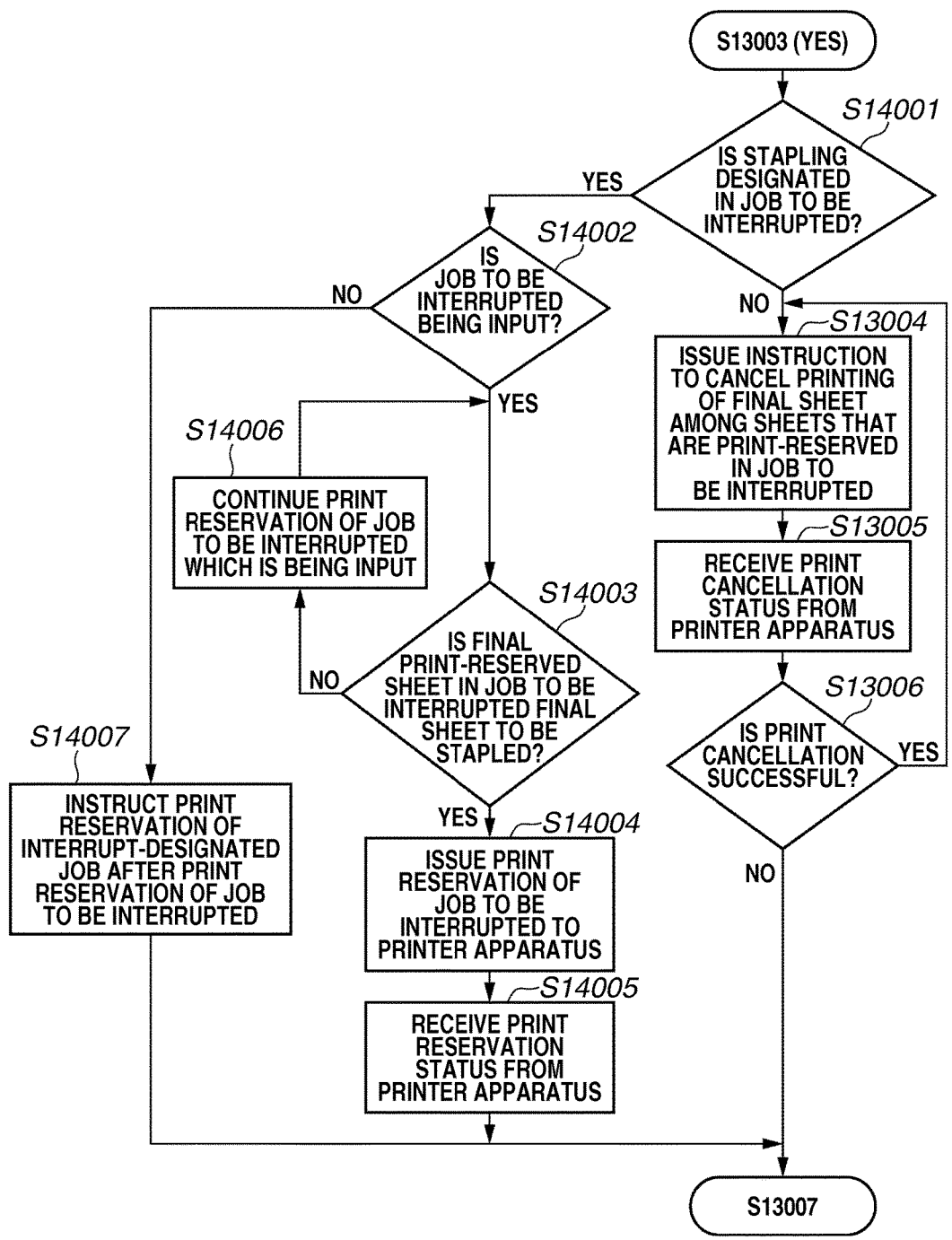
FIG. 15 is a flowchart illustrating an example of control performed according to an exemplary embodiment.

The process procedure performed by the control apparatus 110 according to the second exemplary embodiment will be described below with reference to FIG. 15. Each of the steps illustrated in FIG. 13 is realized by the CPU 120 in the control apparatus 110 reading and executing the programs stored in the ROM 160.

Since the processes from step S13003 and thereafter are different from the process according to the first exemplary embodiment, the processes from step S13003 will be described below.

According to the second exemplary embodiment, the process starts from the control apparatus 110 determining in step S13003 illustrated in FIG. 13, that the job to be interrupted is input in the image forming apparatus 100 previous to the interrupt job. The process then proceeds to step S14001.

In step S14001, the control apparatus 110 determines whether the job to be interrupted is designated to perform stapling. If the interrupted job is not designated to perform stapling (NO in step S14001), the process proceeds to step S13004. Since the processes of step S13004 to step S13006 are similar to those described in the first exemplary embodiment, detailed description will be omitted.

On the other hand, if the job to be interrupted is designated to perform stapling (YES in step S14001), the process proceeds to step 14002. In step S14002, the control apparatus 110 determines whether the job to be interrupted is being input. If the job to be interrupted is being input (YES in step S14002), the process proceeds to step S14003. On the other hand, if the job to be interrupted is not being input (i.e., has been already input) (NO in step S14002), the process proceeds to step S14007.

In step S14007, the control apparatus instructs generation of the print reservation for the job that has been interrupt-designated, subsequent to the print reservation of the job to be interrupted. The process then proceeds to step S13007 illustrated in FIG. 13.

In step S14003, the control apparatus 110 determines whether the sheet corresponding to the last print reservation for the interrupted job is the last sheet in the sheet bundle to be stapled. If the sheet is not the last sheet in the sheet bundle to be stapled (NO in step S14003), the process proceeds to step S14006. In step S14006, the control apparatus 110 continues to generate the print reservation of the job to be interrupted that is being input. If the sheet is the last sheet in the sheet bundle to be stapled (YES in step S14003), the process proceeds to step S14004.

In step S14004, the control apparatus 110 issues the print reservation of the interrupted job to the printer apparatus 300. In step S14005, the control apparatus 110 stands by for receiving of the print reservation status from the printer apparatus 300. If the control apparatus 110 receives the print reservation status, the process proceeds to step S13007 illustrated in FIG. 13.

By performing the above-described control, the print reservation of the sheet that has not been actually fed is cancelled, and the execution of the interrupt job can be accelerated. As a result, the user can quickly receive the printed product of the interrupt job. Further, if the job to be interrupted is the staple job, the printed product corresponding to the interrupt job is prevented from mixing with the printed product corresponding to the interrupted job. An appropriate printed product can thus be provided to the user.

According to the above-described exemplary embodiments, the image forming apparatus separately includes the control apparatus 110 and the printer apparatus 300. However, one controller may include each of the configurations, and the controller may set the sheet feed schedule.

Other Embodiments

Aspects can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A printing apparatus comprising:
   a first sheet support unit configured to support sheets;
   a second sheet support unit configured to support sheets;
   a feed reservation unit configured to issue a feed reservation for specifying, from among the first and second support units, a support unit from which a sheet is fed for each page of a first job;
   a sheet feeding unit configured to feed one of sheets supported by the specified sheet support unit for each page;
   a transfer unit configured to transfer an image of each page on the fed sheet, wherein a sheet conveyance path from the second sheet support unit to the transfer unit is longer than a sheet conveyance path from the first sheet support unit to the transfer unit, and wherein the sheet feeding unit feeds one of the sheets supported by the second sheet support unit for a page of the first job before feeding one of the sheets supported by the first sheet support unit for a previous page of the first job; and a cancel unit configured to cancel a feed reservation for a page of the first job, wherein, when the first job is interrupted by a second job after the feed reservation for each page of the first job has been issued, the cancel unit cancels the feed reservation for the page for which a sheet has not been fed and behind which there is no page for which a sheet has been fed, the cancel unit does not cancel a feed reservation for a page for which a sheet has not been fed and behind which there is a page for which a sheet has been fed, and wherein the feed reservation unit, and the cancel unit are implemented by at least one processor.

2. The printing apparatus according to claim 1, wherein the feed reservation for printing a N+1th page is issued in response to completion of analysis of the N+1th page.

3. The printing apparatus according to claim 1, further comprising an interrupt key configured to be used by a user for instructing an interruption of a printing job.

4. The printing apparatus according to claim 1, further comprising a scanner configured to read an image on an original, wherein an image to be printed on a fed sheet is the image read by the scanner.

5. The printing apparatus according to claim 1, wherein a sheet feed controller implemented by a processor is configured to determine whether feeding of a sheet to be used for printing a N+1th page has been initiated, wherein, when the first job is interrupted by the second job after the feed reservation for each page of the first job has been issued, (i) an interrupt controller performs control to print, when the sheet feed controller determines that the feeding of the sheet to be used for printing the N+1th page has not been initiated, a page included in the second job before the printing of the N+1th page, and (ii) the interrupt controller performs control not to print, when the sheet feed controller determines that the feeding of the sheet to be used for printing the N+1th page has been initiated, a page included in the second job before the printing of the N+1th page.

6. The printing apparatus according to claim 1, wherein, when the first job is interrupted by a second job after the feed reservation for each page of the first job has been issued, the cancel unit sequentially cancels the pages for which sheets have not been fed from the last page of the first job, and stops the sequential canceling in response to finding a page for which a sheet has been fed.

7. The printing apparatus according to claim 1, wherein an interrupt controller alters a status of a feed reservation of the first job by canceling at least the issued feed reservation for printing an N+1th page.

8. The printing apparatus according to claim 7, wherein the interrupt controller (i) cancels a last issued feed reservation and (ii) cancels each issued feed reservation adjacently connected in series to the last issued feed reservation whose page has a corresponding sheet that has not been fed.

9. The printing apparatus according to claim 7, wherein the interrupt controller cancels the issued feed reservation for the first job sequentially from a last issued feed reservation through an issued feed reservation arranged immediately before an issued feed reservation of a page having a corresponding sheet that has been fed, and inserts the second print job after the issued feed reservation of the page having the corresponding sheet that has been fed.

10. The printing apparatus according to claim 7, wherein, after issuing the feed reservation of the second job, the interrupt controller re-issues the canceled issued feed reservation for printing the N+1th page.

11. The printing apparatus according to claim 1, wherein an interrupt controller alters a status of a feed reservation of the first job by refraining from issuing feed reservations of the first job subsequent to the feed reservation for printing an Nth page and the feed reservation for printing an N+1th page.

12. The printing apparatus according to claim 11, wherein the interrupt controller refrains from issuing subsequent feed reservations by refraining from inputting the subsequent feed reservations of the first job into a reservation cue.

13. The printing apparatus according to claim 11, wherein the interrupt controller performs control to print the page included in the second job before printing the N+1th page by (i) refraining from issuing feed reservations of the first job subsequent to the feed reservation for printing the Nth page and the feed reservation for printing the N+1th page and (ii) canceling at least the issued feed reservation for printing the N+1th page.

14. A printing apparatus comprising:

a first sheet support unit configured to support sheets;

a second sheet support unit configured to support sheets;

a feed reservation unit configured to issue a feed reservation for specifying, from among the first and second support units, a support unit from which a sheet is fed for each page of a first job;

a sheet feeding unit configured to feed one of sheets supported by the specified sheet support unit for each page;

a transfer unit configured to transfer an image of each page on the fed sheet, wherein a sheet conveyed along a sheet conveyance path from the second sheet support unit to the transfer unit requires more time to reach the transfer unit than a sheet conveyed along a sheet conveyance path from the first sheet support unit to the transfer unit, and wherein the sheet feeding unit feeds one of the sheets supported by the second sheet support unit for a page of the first job before feeding one of the sheets supported by the first sheet support unit for a previous page of the first job; and a cancel unit configured to cancel a feed reservation for a page of the first job, wherein, when the first job is interrupted by a second job after the feed reservation for each page of the first job has been issued, the cancel unit cancels the feed reservation for the page for which a sheet has not been fed and behind which there is no page for which a sheet has been fed, the cancel unit does not cancel a feed reservation for a page for which a sheet has not been fed and behind which there is a page for which a sheet has been fed, and wherein the feed reservation unit, and the cancel unit are implemented by at least one processor.

15. The printing apparatus according to claim 14, wherein the feed reservation for printing a N+1th page is issued in response to completion of analysis of the N+1th page.

16. The printing apparatus according to claim 14, further comprising an interrupt key configured to be used by a user for instructing an interruption of a printing job.

17. The printing apparatus according to claim 14, further comprising a scanner configured to read an image on an original,
wherein an image to be printed on a fed sheet is the image read by the scanner.

18. The printing apparatus according to claim 14, wherein a sheet feed controller implemented by a processor is configured to determine whether feeding of a sheet to be used for printing a N+1th page has been initiated,
wherein, when the first job is interrupted by the second job after the feed reservation for each page of the first job has been issued,
(i) an interrupt controller performs control to print, when the sheet feed controller determines that the feeding of the sheet to be used for printing the N+1th page has not been initiated, a page included in the second job before the printing of the N+1th page, and
(ii) the interrupt controller performs control not to print, when the sheet feed controller determines that the feeding of the sheet to be used for printing the N+1th page has been initiated, a page included in the second job before the printing of the N+1th page.

19. A control method for controlling a printing apparatus having a first sheet support unit configured to support sheets, a second sheet support unit configured to support sheets, a feed reservation unit implemented by at least one processor, a sheet feeding unit, and a transfer unit, the control method comprising:
issuing, from the feed reservation unit, a feed reservation for specifying, from among the first and second support units, a support unit from which a sheet is fed for each page of a first job;
feeding, via the sheet feeding unit, one of sheets supported by the specified sheet support unit for each page;
transferring, via the transfer unit, an image of each page on the fed sheet,
wherein a sheet conveyance path from the second sheet support unit to the transfer unit is longer than a sheet conveyance path from the first sheet support unit to the transfer unit, and
wherein the sheet feeding unit feeds one of the sheets supported by the second sheet support unit for a page of the first job before feeding one of the sheets supported by the first sheet support unit for a previous page of the first job; and
canceling a feed reservation for a page of the first job,
wherein, when the first job is interrupted by a second job after the feed reservation for each page of the first job has been issued,
canceling includes canceling the feed reservation for the page for which a sheet has not been fed and behind which there is no page for which a sheet has been fed,
canceling includes not canceling a feed reservation for a page for which a sheet has not been fed and behind which there is a page for which a sheet has been fed.

20. A control method for controlling a printing apparatus having a first sheet support unit configured to support sheets, a second sheet support unit configured to support sheets, a feed reservation unit implemented by at least one processor, a sheet feeding unit, and a transfer unit, the control method comprising:
issuing, from the feed reservation unit, a feed reservation for specifying, from among the first and second support units, a support unit from which a sheet is fed for each page of a first job;
feeding, via the sheet feeding unit, one of sheets supported by the specified sheet support unit for each page;
transferring, via the transfer unit, an image of each page on the fed sheet, wherein a sheet conveyed along a sheet conveyance path from the second sheet support unit to the transfer unit requires more time to reach the transfer unit than a sheet conveyed along a sheet conveyance path from the first sheet support unit to the transfer unit, and
wherein the sheet feeding unit feeds one of the sheets supported by the second sheet support unit for a page of the first job before feeding one of the sheets supported by the first sheet support unit for a previous page of the first job; and
canceling a feed reservation for a page of the first job,
wherein, when the first job is interrupted by a second job after the feed reservation for each page of the first job has been issued,
canceling includes canceling the feed reservation for the page for which a sheet has not been fed and behind which there is no page for which a sheet has been fed,
canceling includes not canceling a feed reservation for a page for which a sheet has not been fed and behind which there is a page for which a sheet has been fed.

21. A non-transitory computer-readable storage medium storing a computer program to cause a computer to perform a control method for controlling a printing apparatus having a first sheet support unit configured to support sheets, a second sheet support unit configured to support sheets, a feed reservation unit implemented by at least one processor, a sheet feeding unit, and a transfer unit, the control method comprising:
issuing, from the feed reservation unit, a feed reservation for specifying, from among the first and second support units, a support unit from which a sheet is fed for each page of a first job;
feeding, via the sheet feeding unit, one of sheets supported by the specified sheet support unit for each page;
transferring, via the transfer unit, an image of each page on the fed sheet,
wherein a sheet conveyance path from the second sheet support unit to the transfer unit is longer than a sheet conveyance path from the first sheet support unit to the transfer unit, and
wherein the sheet feeding unit feeds one of the sheets supported by the second sheet support unit for a page of the first job before feeding one of the sheets supported by the first sheet support unit for a previous page of the first job; and
canceling a feed reservation for a page of the first job,
wherein, when the first job is interrupted by a second job after the feed reservation for each page of the first job has been issued,
canceling includes canceling the feed reservation for the page for which a sheet has not been fed and behind which there is no page for which a sheet has been fed,
canceling includes not canceling a feed reservation for a page for which a sheet has not been fed and behind which there is a page for which a sheet has been fed.

22. A non-transitory computer-readable storage medium storing a computer program to cause a computer to perform a control method for controlling a printing apparatus having a first sheet support unit configured to support sheets, a second sheet support unit configured to support sheets, a feed reservation unit implemented by at least one processor, a sheet feeding unit, and a transfer unit, the control method comprising:

issuing, from the feed reservation unit, a feed reservation for specifying, from among the first and second support units, a support unit from which a sheet is fed for each page of a first job;

feeding, via the sheet feeding unit, one of sheets supported by the specified sheet support unit for each page;

transferring, via the transfer unit, an image of each page on the fed sheet, wherein a sheet conveyed along a sheet conveyance path from the second sheet support unit to the transfer unit requires more time to reach the transfer unit than a sheet conveyed along a sheet conveyance path from the first sheet support unit to the transfer unit, and wherein the sheet feeding unit feeds one of the sheets supported by the second sheet support unit for a page of the first job before feeding one of the sheets supported by the first sheet support unit for a previous page of the first job; and canceling a feed reservation for a page of the first job, wherein, when the first job is interrupted by a second job after the feed reservation for each page of the first job has been issued, canceling includes canceling the feed reservation for the page for which a sheet has not been fed and behind which there is no page for which a sheet has been fed, canceling includes not canceling a feed reservation for a page for which a sheet has not been fed and behind which there is a page for which a sheet has been fed.

23. A printing apparatus comprising:
a first sheet support unit configured to support sheets;
a second sheet support unit configured to support sheets;
a feed reservation unit configured to issue a feed reservation for specifying, from among the first and second support units, a support unit from which a sheet is fed for each page of a first job;

a sheet feeding unit configured to feed one of sheets supported by the specified sheet support unit for each page;

a transfer unit configured to transfer an image of each page on the fed sheet, wherein the sheet feeding unit feeds one of the sheets supported by the second sheet support unit for a page of the first job before feeding one of the sheets supported by the first sheet support unit for a previous page of the first job; and a cancel unit configured to cancel a feed reservation for a page of the first job, wherein, when the first job is interrupted by a second job after the feed reservation for each page of the first job has been issued, the cancel unit cancels the feed reservation for the page for which a sheet has not been fed and behind which there is no page for which a sheet has been fed, the cancel unit does not cancel a feed reservation for a page for which a sheet has not been fed and behind which there is a page for which a sheet has been fed, and wherein the feed reservation unit, and the cancel unit are implemented by at least one processor.

24. The printing apparatus according to claim 23, wherein a sheet feed controller implemented by a processor is configured to determine whether feeding of a sheet to be used for printing a N+1th page has been initiated, wherein, when the first job is interrupted by the second job after the feed reservation for each page of the first job has been issued, (i) an interrupt controller performs control to print, when the sheet feed controller determines that the feeding of the sheet to be used for printing the N+1th page has not been initiated, a page included in the second job before the printing of the N+1th page, and (ii) the interrupt controller performs control not to print, when the sheet feed controller determines that the feeding of the sheet to be used for printing the N+1th page has been initiated, a page included in the second job before the printing of the N+1th page.

* * * * *